United States Patent
Ryu

(10) Patent No.: US 7,965,730 B2
(45) Date of Patent: Jun. 21, 2011

(54) FRAME TRANSMITTING APPARATUS AND METHOD UTILIZING A ROUND-ROBIN TECHNIQUE

(75) Inventor: Kazuya Ryu, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 154 days.

(21) Appl. No.: 12/320,361

(22) Filed: Jan. 23, 2009

(65) Prior Publication Data

US 2009/0279428 A1    Nov. 12, 2009

(30) Foreign Application Priority Data

May 12, 2008   (JP) .................................. 2008-125253

(51) Int. Cl.
*H04L 12/54* (2006.01)
*G01R 31/08* (2006.01)

(52) U.S. Cl. .................... 370/428; 370/232; 370/413
(58) Field of Classification Search .................. 370/413, 370/428, 232
See application file for complete search history.

(56) References Cited

U.S. PATENT DOCUMENTS

| | | | | |
|---|---|---|---|---|
| 7,310,345 | B2 * | 12/2007 | Goetzinger et al. | 370/412 |
| 2002/0054602 | A1 * | 5/2002 | Takahashi et al. | 370/412 |
| 2003/0189947 | A1 * | 10/2003 | Beshai | 370/428 |
| 2003/0223445 | A1 * | 12/2003 | Lodha | 370/412 |

FOREIGN PATENT DOCUMENTS

| | | |
|---|---|---|
| JP | 03-069231 | 3/1991 |
| JP | 2005-020307 | 1/2005 |

* cited by examiner

*Primary Examiner* — Ricky Ngo
*Assistant Examiner* — Paul Masur
(74) *Attorney, Agent, or Firm* — Fujitsu Patent Center

(57) ABSTRACT

A frame transmitting apparatus transmits a frame to a frame receiving apparatus. The frame transmitting apparatus includes the following units. An accumulated-capacity-value storage unit has stored therein an accumulated capacity value calculated. A cycle and capacity storage unit has stored therein a cycle and frame read capacity at every cycle. An adding unit adds the value indicative of the capacity of the frame to the accumulated capacity value. A subtracting unit subtracts the value indicative of the frame read capacity from the accumulated capacity value. A transmission controlling unit controls frame transmission by using the accumulated capacity value.

5 Claims, 13 Drawing Sheets

FIG.4

| ROUTE | OUTPUT BAND |
|---|---|
| 1 | 1 Gbps |
| 2 | 100 Mbps |
| 3 | 10 Mbps |
| ⋮ | ⋮ |

FIG.5

| DECISION DETAIL | DECISION THRESHOLD (BYTES) |
|---|---|
| FULL DECISION | 1800 OR GREATER |
| CLEAR FULL DECISION | 1600 OR SMALLER |
| EMPTY DICISION | 64 OR SMALLER |
| CLEAR EMPTY DECISION | 128 OR GREATER |

FIG.6

| ROUTE | ACCUMULATED CAPACITY VALUE (BYTES) |
|---|---|
| 1 | 1500 BYTES |
| 2 | |
| ⋮ | |

FRAME TRANSMITTING APPARATUS AND METHOD UTILIZING A ROUND-ROBIN TECHNIQUE

CROSS-REFERENCE TO RELATED APPLICATION

This application is based upon and claims the benefit of priority of the prior Japanese Patent Application No. 2008-125253, filed on May 12, 2008, the entire contents of which are incorporated herein by reference.

FIELD

The embodiments discussed herein are directed to frame transmitting apparatuses, frame transmitting methods, and frame transmitting programs.

BACKGROUND

Conventionally, various techniques are used for a frame transmitting process from a frame transmitting apparatus.

For Example, in a conventional technique, the frame transmitting apparatus receives from a frame receiving apparatus the state of frames accumulated in a buffer of the frame receiving apparatus (frame accumulation information). The frame transmitting apparatus then uses the received frame accumulation information to control a frame transmitting process.

Specifically, for example, the frame transmitting apparatus receives the frame accumulation information from the frame receiving apparatus at short cycles. The frame transmitting apparatus then uses the frame accumulation information received at short cycles to perform a frame transmitting process according to the state of accumulation in the buffer of the frame receiving apparatus.

In another exemplary conventional technique (for example, Japanese Laid-open Patent Publication No. 2005-20307, pp. 1-6, FIG. 1), a frame transmitting process is controlled in consideration of processing load on the frame transmitting apparatus and a frame flow rate (hereinafter, a "technique in consideration of processing load, and the like"). In still another exemplary conventional technique (for example, Japanese Laid-open Patent Publication No. 03-69231, pp. 1-3, FIG. 1), when the frame transmitting apparatus transmits a frame to a plurality of routes, the frame transmitting apparatus uses transmission history having stored therein previously-used routes to select a route to which the frame is to be transmitted next (hereinafter, a "technique using transmission history").

Meanwhile, the techniques have a problem such that, in performing a frame transmitting process in consideration of the state of accumulation on a frame receiving apparatus side, it is difficult to reduce traffic from the frame receiving apparatus to the frame transmitting apparatus.

For example, in performing a frame transmitting process in consideration of the state of accumulation on a frame receiving apparatus side, the conventional frame transmitting apparatus has to receive the frame accumulation information from the frame receiving apparatus at short cycles. Therefore, it is difficult to reduce traffic from the frame receiving apparatus to the frame transmitting apparatus.

Note that, for example, in the technique in consideration of processing load, and the like, and the technique using transmission history, a frame transmitting process in consideration of the state of accumulation on a frame receiving apparatus side is not performed.

SUMMARY

According to an aspect of the invention, a frame transmitting apparatus transmits a frame to a frame receiving apparatus. The frame transmitting apparatus includes an accumulated-capacity-value storage unit that has stored therein an accumulated capacity value calculated by the frame transmitting apparatus as a value indicative of a capacity of the frame accumulated in a buffer of the frame receiving apparatus; a cycle and capacity storage unit that has stored therein a cycle at which the frame accumulated in the buffer is read by the frame receiving apparatus and a frame read capacity read by the frame receiving apparatus at every cycle; and an adding unit that adds, for every transmission of the frame, the value indicative of the capacity of the frame to the accumulated capacity value stored in the accumulated-capacity-value storage unit; a subtracting unit that subtracts, at every cycle stored in the cycle and capacity storage unit, the value indicative of the frame read capacity stored in the cycle and capacity storage unit from the accumulated capacity value stored in the accumulated-capacity-value storage unit; and a transmission controlling unit that controls frame transmission by using the accumulated capacity value stored in the accumulated-capacity-value storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a drawing for explaining an example of output bands stored in an output-route-band setting storage unit in the first embodiment;

FIG. 5 is a drawing for explaining an example of decision thresholds stored in a state-decision-threshold setting storage unit in the first embodiment;

FIG. 6 is a drawing for explaining an example of accumulated-capacity values stored in a FIFO-capacity byte counter unit in the first embodiment;

DESCRIPTION OF EMBODIMENTS

Preferred embodiments of the present invention will be explained with reference to accompanying drawings. Embodiments of the frame transmitting apparatus, frame transmitting method, and frame transmitting program according to the present invention are explained in detail below. In the following, main terms for use in a first embodiment, a general outline of a frame transmitting apparatus according to the first embodiment, and the configuration and process flow of the frame transmitting apparatus are explained in sequence, and then other embodiments are explained.

First Embodiment

[General Outline of the Frame Transmitting Apparatus]

Figure 1:
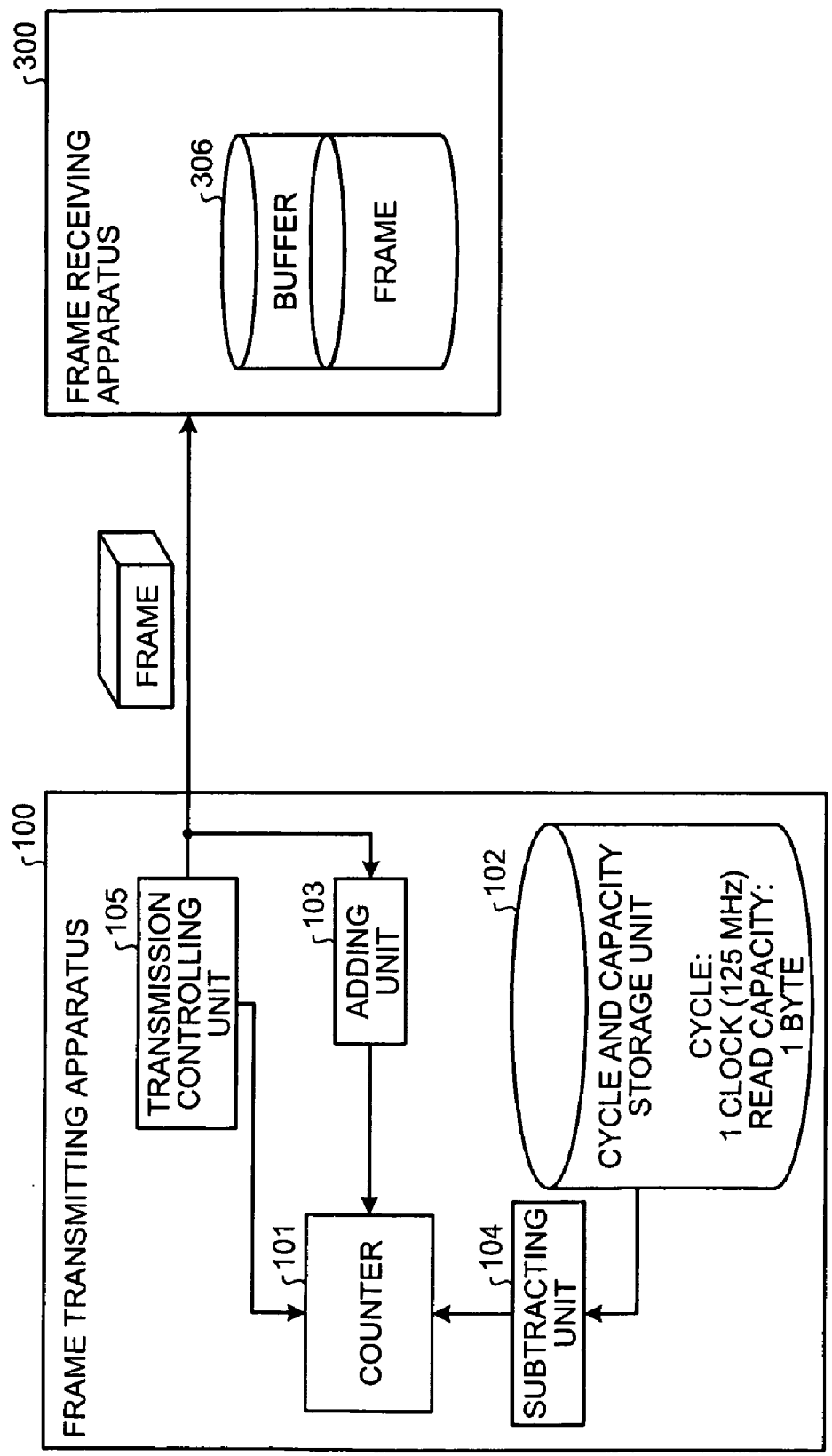
FIG. 1 is a drawing for explaining a general outline of a frame transmitting apparatus according to a first embodiment.

First, by using FIG. 1, the general outline of the frame transmitting apparatus according to the first embodiment is explained. FIG. 1 is a drawing for explaining the general outline of the frame transmitting apparatus according to the first embodiment.

As depicted in the drawing, a frame transmitting apparatus 100 according to the first embodiment transmits a frame to a frame receiving apparatus 300. Note in FIG. 1 that, for convenience of explanation, the frame receiving apparatus 300 receiving a frame transmitted from the frame transmitting apparatus 100 is also depicted. The frame receiving apparatus 300 includes a buffer 306, and stores a frame received from the frame transmitting apparatus 100 in the buffer 306. After storing the frame in the buffer 306, the frame receiving apparatus 300 reads the frame from the buffer 306 for processing (such as transmitting the frame to another apparatus).

As will be explained in the following, the frame transmitting apparatus 100 according to the first embodiment can reduce traffic from the frame receiving apparatus 300 to the frame transmitting apparatus 100.

That is, the frame transmitting apparatus 100 according to the first embodiment includes a counter 101 having stored therein an accumulated capacity value, as depicted in FIG. 1. Specifically, for example, in the frame transmitting apparatus 100 according to the first embodiment, the counter 101 has stored therein "800 bytes" or "1500 bytes" as an accumulated capacity value. The accumulated capacity value is a value calculated in the frame transmitting apparatus 100 indicative of a capacity of frames accumulated in the buffer 306 of the frame receiving apparatus 300.

The frame transmitting apparatus 100 according to the first embodiment includes a cycle and capacity storage unit 102 having stored therein "cycle" and "read capacity", as depicted in FIG. 1. The "cycle" is a cycle in which the frame receiving apparatus 300 reads from the buffer 306 frames accumulated in the buffer 306. The "read capacity" is a frame capacity read by the frame receiving apparatus 300 at each cycle.

Specifically, for example, in the frame transmitting apparatus 100 according to the first embodiment, the cycle and capacity storage unit 102 has stored therein a cycle of "1 clock (125 megahertz)" and a read capacity of "1 byte".

Here, the frame transmitting apparatus 100 according to the first embodiment increases the accumulated capacity value. Specifically, in the frame transmitting apparatus 100 according to the first embodiment, as depicted in FIG. 1, for every transmission of a frame, an adding unit 103 adds to the accumulated capacity value stored in the counter 101 a value indicative of a capacity of a frame to be transmitted.

A specific example is explained in which the frame transmitting apparatus 100 according to the first embodiment transmits a frame of "100 bytes" to the frame receiving apparatus 300. It is assumed herein that the counter 101 has stored therein an accumulated capacity value of "800 bytes". As depicted in FIG. 1, in the frame transmitting apparatus 100 according to the first embodiment, the adding unit 103 adds "100 bytes" to the accumulated capacity value of "800 bytes" stored in the counter 101, resulting in "900 bytes".

Also, the frame transmitting apparatus 100 according to the first embodiment decreases the accumulated capacity value. Specifically, in the frame transmitting apparatus 100 according to the first embodiment, as depicted in FIG. 1, at every cycle stored in the cycle and capacity storage unit 102, a subtracting unit 104 subtracts the accumulated capacity value stored in the counter 101. Also, in the frame transmitting apparatus 100 according to the first embodiment, the subtracting unit 104 subtracts from the accumulated capacity value a value indicative of a read capacity stored in the cycle and capacity storage unit 102.

A specific example is explained in which the cycle and capacity storage unit 102 has stored therein a cycle of "1 clock (125 megahertz)" and a read capacity of "1 byte". It is assumed herein that the counter 101 has stored therein an accumulated capacity value of "900 bytes". In the frame transmitting apparatus 100 according to the first embodiment, at every "1 clock", the subtracting unit 104 subtracts "1 byte" from the accumulated capacity value stored in the counter 101. For example, the subtracting unit 104 subtracts "1 byte" from the accumulated capacity value of "900 bytes", resulting in an accumulated capacity value of "899 bytes". After "1 clock" elapsed, the subtracting unit 104 subtracts "1 byte" from the accumulated capacity value of "899 bytes", resulting in an accumulated capacity value of "898 bytes".

The frame transmitting apparatus 100 according to the first embodiment then uses the accumulated capacity value stored in the counter 101 to control frame transmission. For example, in the frame transmitting apparatus 100 according to the first embodiment, when an accumulated capacity value stored in the counter 101 is "1500 bytes", a transmission controlling unit 105 stops a frame transmitting process. Then, in the frame transmitting apparatus 100 according to the first embodiment, the transmission controlling unit 105 restarts frame transmission when the accumulated capacity value is decreased by the subtracting unit 104 to become smaller than accumulated capacity value "1500 bytes".

With this, as explained above, the frame transmitting apparatus 100 according to the first embodiment can reduce traffic from the frame receiving apparatus 300 to the frame transmitting apparatus 100.

Specifically, in the conventional technique, the frame transmitting apparatus receives from the frame receiving apparatus the frame accumulation information of the buffer included in the frame receiving apparatus, and then uses the received frame accumulation information to control a frame transmitting process.

Compared with such a conventional technique, in the disclosed frame transmitting apparatus 100, the frame transmitting apparatus 100 itself emulates the frame accumulation state of the frame receiving apparatus 300. Then, not the frame accumulation information received from the frame receiving apparatus 300 but the emulation results are used to control a frame transmitting process. Therefore, traffic from the frame receiving apparatus 300 to the frame transmitting apparatus 100 can be reduced.

[Configuration of the Frame Transmitting Apparatus]

Next, by using FIGS. 2 to 6, the configuration of the frame transmitting apparatus 100 depicted in FIG. 1 is explained. In the following, the entire configuration of the frame transmitting apparatus 100 including a per-output-route First-In First-Out (FIFO)-capacity emulating unit 200 is first explained. Then, the configuration of the frame receiving apparatus 300 is explained. And then the configuration of the per-output-route FIFO-capacity emulating unit 200 is explained.

[Entire Configuration of the Frame Transmitting Apparatus]

Figure 2:
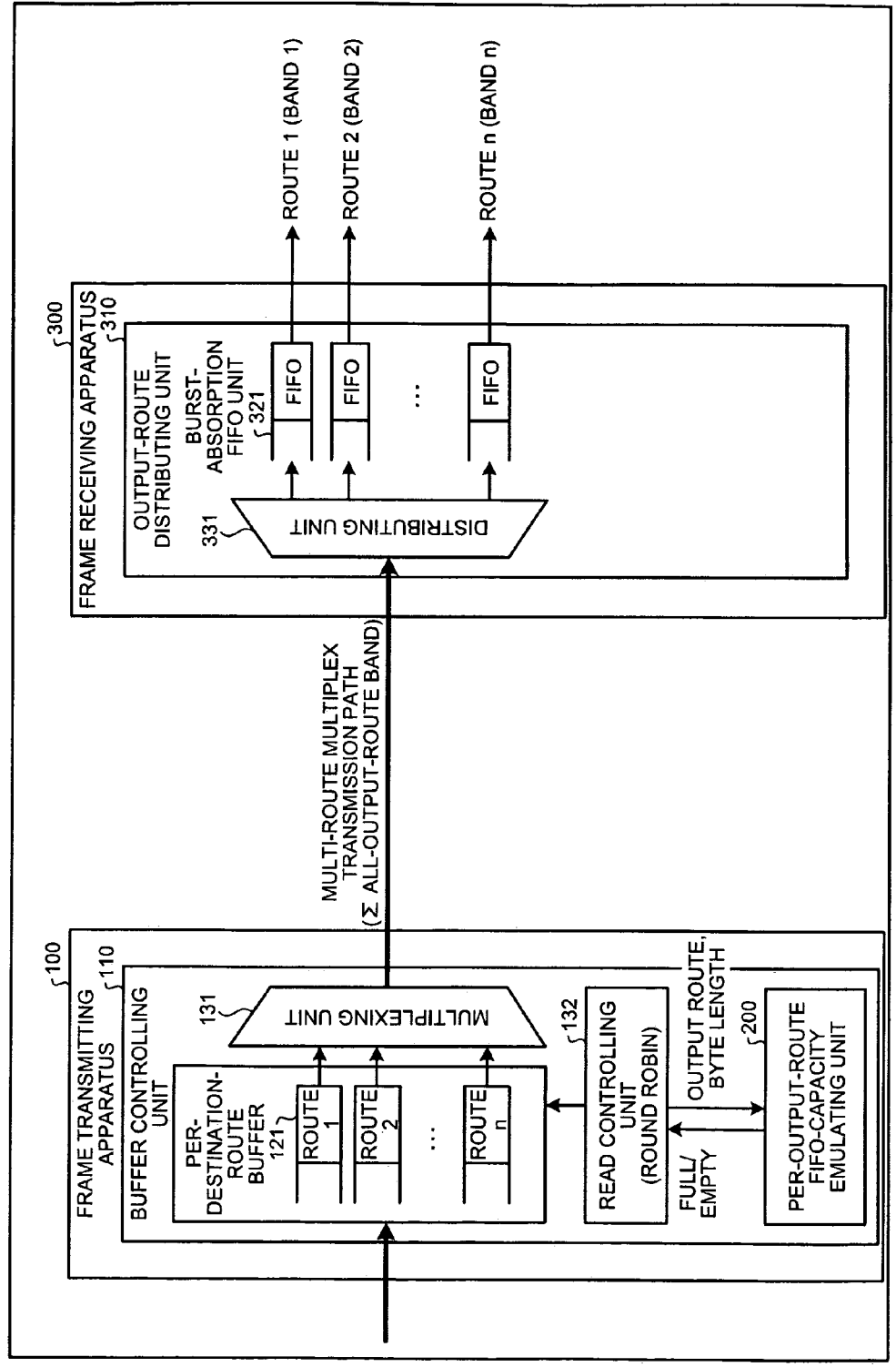
FIG. 2 is a block diagram for explaining the configuration of the frame transmitting apparatus according to the first embodiment.

First, by using FIG. 2, the configuration of the frame transmitting apparatus 100 including the per-output-route FIFO-capacity emulating unit 200 is explained. FIG. 2 is a block diagram for explaining the configuration of the frame transmitting apparatus 100 according to the first embodiment. In FIG. 2, the configuration of the frame receiving apparatus 300 that receives a frame transmitted from the frame transmitting apparatus 100 is also depicted.

As depicted in FIG. 2, the frame transmitting apparatus 100 transmits a frame to the frame receiving apparatus 300. Specifically, the frame transmitting apparatus 100 includes a buffer controlling unit 110. Also, in the frame transmitting apparatus 100, the buffer controlling unit 110 reads a frame from a per-destination-route buffer 121, and then transmits the read frame to the frame receiving apparatus 300.

The buffer controlling unit 110 particularly includes the per-destination-route buffer 121, a multiplexing unit 131, a read controlling unit 132, and the per-output-route FIFO-capacity emulating unit 200. In the following explanation, it is assumed that the buffer controlling unit 110 includes separate per-output-route FIFO-capacity emulating units 200 for respective routes. That is, in the following explanation, it is assumed that, in the case of "n" routes, the buffer controlling unit 110 includes "n" per-output-route FIFO-capacity emulating units 200.

The per-destination-route buffer 121 is connected to the read controlling unit 132 and the multiplexing unit 131. Also, the per-destination-route buffer 121 has stored therein frames to be transmitted from the frame transmitting apparatus 100 to the frame receiving apparatus 300. Specifically, the per-destination-route buffer 121 includes a plurality of buffers (transmitting side). Also, the per-destination-route buffer 121 has frames to be transmitted to the routes stored in a different buffer (transmitting side) for each route.

For example, a specific example is explained in which routes "1" to "n" are present. The per-destination-route buffer 121 includes buffers (transmitting side) "route 1" to "route n". The buffers (transmitting side) "route 1" to "route n" have stored therein frames to be transmitted to the routes "1" to "n", respectively.

In the first embodiment, an example is explained in which the per-destination-route buffer 121 has frames to be transmitted to the routes "1" to "n" stored in a different buffer (transmitting side) for each route. However, the present invention is not meant to be restricted to this.

Alternatively, for example, the per-destination-route buffer 121 may include only one buffer (transmitting side) to manage a capacity allowable for use and a used capacity for each route, thereby storing frames in the one buffer (transmitting side) irrespectively of the route to which a frame is to be transmitted.

Also, the per-destination-route buffer 121 stores a frame to be transmitted to the frame receiving apparatus 300, the frame being input by the frame transmitting apparatus 100. The frame input by the frame transmitting apparatus 100 to the per-destination-route buffer 121 is the one, for example, transmitted from another apparatus to the frame transmitting apparatus 100. Also, the frame stored in the per-destination-route buffer 121 is read by the read controlling unit 132, and is then sent by the read controlling unit 132 to the multiplexing unit 131.

The multiplexing unit 131 is connected to the per-destination-route buffer 121. Also, the multiplexing unit 131 is connected via an optical line or the like to the frame receiving apparatus 300 (a distributing unit 331). Furthermore, the multiplexing unit 131 transmits a frame to the frame receiving apparatus 300. Specifically, the multiplexing unit 131 transmits to the frame receiving apparatus 300 a frame read by the read controlling unit 132 from the per-destination-route buffer 121. Specifically, for example, the multiplexing unit 131 receives frames read by the read controlling unit 132 from each buffer (transmitting side) different for each route included in the per-destination-route buffer 121, the frames being transmitted by the read controlling unit 132 from the per-destination-route buffer 121. Then, the multiplexing unit 131 transmits the frames received from the per-destination-route buffer 121 via a multi-route multiplex transmission path to each route.

Here, the frame transmitting process performed by the multiplexing unit 131 is controlled through a frame reading process by the read controlling unit 132.

The read controlling unit 132 (hereinafter, also referred to as "transmission controlling unit") is connected to the per-destination-route buffer 121 and the per-output-route FIFO-capacity emulating unit 200. Also, the read controlling unit 132 controls a process of reading a frame from the per-destination-route buffer 121. Furthermore, the read controlling unit 132 transmits information about the frame read from the per-destination-route buffer 121 to each per-output-route FIFO-capacity emulating unit 200. In the following, a frame reading process is first explained, and then transmission to each per-output-route FIFO-capacity emulating unit 200 is explained.

First, a frame reading process by the read controlling unit 132 is explained. Specifically, the read controlling unit 132 controls a frame reading from the per-destination-route buffer 121 with a round-robin technique.

In more detail, the read controlling unit 132 uses an accumulated capacity value stored in each per-output-route FIFO-capacity emulating unit 200 (each FIFO-capacity byte counter unit 203) to control frame reading from the per-destination-route buffer 121. Here, each accumulated capacity value stored in each per-output-route FIFO-capacity emulating unit 200 (each FIFO-capacity byte counter unit 203) is an accumulated capacity value stored for each route.

For explaining a frame reading process by the read controlling unit 132, a specific example is as follows. It is assumed herein that the routes are "1" to "n". For example, the read controlling unit 132 sequentially reads frames from buffers (transmitting side) "route 1" to "route n" storing the frames to be transmitted to the routes "1" to "n". Also, the read controlling unit 132 repeats the process of reading from each of the buffers (transmitting side) "route 1" to "route n".

Furthermore, the read controlling unit 132 accepts, from each per-output-route FIFO-capacity emulating unit 200 provided to each route, a Full signal (will be explained further below), a Full clear signal (will be explained further below), an Empty signal (will be explained further below), or an Empty clear signal (will be explained further below). The read controlling unit 132 then controls the frame reading process.

Here, the Full signal, the Full clear signal, the Empty signal, and the Empty clear signal represent information transmitted by each per-output-route FIFO-capacity emulating unit 200 (each FIFO-state deciding unit 213, which will be explained further below) to the read controlling unit 132.

A case is explained where the read controlling unit 132 accepts a Full signal. The read controlling unit 132 stops reading from the per-destination-route buffer 121 a frame to be transmitted to a route to which a Full signal is sent.

For example, a specific example is explained where routes "1" to "n" are present. Also, it is assumed that the buffers (transmitting side) "route 1" to "route n" have stored therein frames to be transmitted to the routes "1" to "n", respectively. Furthermore, it is assumed that the read controlling unit 132 accepts a Full signal from the per-output-route FIFO-capacity emulating unit 200 for the route "1". Here, the read controlling unit 132 stops reading a frame from the buffer (transmitting side) "route 1". That is, the read controlling unit 132 skips a process of reading a frame from the buffer (transmitting side) "route 1" and repeats a process of reading a frame from the other buffers (transmitting side) "route 2" to "route n".

A case is explained where the read controlling unit 132 accepts a Full clear signal. The read controlling unit 132 restarts a process of reading from the buffer (transmitting side) a frame to be transmitted to a route to which a Full clear signal is sent.

For example, it is assumed in the explanation that the read controlling unit 132 accepts a Full signal from the per-output-route FIFO-capacity emulating unit 200 for the route "1" and then accepts a Full clear signal. Here, the read controlling unit 132 restarts the process of reading a frame from the buffer (transmitting side) "route 1". That is, the read controlling unit 132 clears the skipping of the process of reading a frame from the buffer (transmitting side) "route 1", and repeats a process of reading a frame from the buffers (transmitting side) "route 1" to "route n".

Also, a case is explained where the read controlling unit 132 accepts an Empty signal. The read controlling unit 132 prioritizes a process of reading from the buffer (transmitting side) a frame to be transmitted to a route to which an Empty signal is sent.

For example, it is assumed in the explanation that the read controlling unit 132 accepts an Empty signal from the per-output-route FIFO-capacity emulating unit 200 for the route "1". Here, the read controlling unit 132 prioritizes the process of reading a frame from the buffer (transmitting side) "route 1" over other processes of reading a frame from the other buffers (transmitting side). That is, the read controlling unit 132 prioritizes the process of reading a frame from the buffer (transmitting side) "route 1" over processes of reading a frame from the buffers (transmitting side) "route 2" to "route n". Specifically, for example, the read controlling unit 132 repeats a frame reading process so that the number of times of reading a frame from the buffer (transmitting side) "route 1" is larger than the number of times of reading a frame from the buffers (transmitting side) "route 2" to "route n".

Also, a case is explained where the read controlling unit 132 accepts an Empty clear signal. The read controlling unit 132 restarts the process of reading from the buffer (transmitting side) a frame to be transmitted to a route to which an Empty clear signal is sent.

For example, it is assumed in the explanation that the read controlling unit 132 accepts an Empty signal from the per-output-route FIFO-capacity emulating unit 200 for the route "1" and then accepts an Empty clear signal. Here, the read controlling unit 132 performs the process of reading a frame from the buffer (transmitting side) "route 1" equally as well as other processes of reading a frame from the other buffers (transmitting side). That is, the read controlling unit 132 performs the process of reading a frame from the buffer (transmitting side) "route 1" as an equivalent process without prioritization over processes of reading a frame from the buffers (transmitting side) "route That is, when accepting a Full decision signal, the read controlling unit 132 makes a setting of stopping frame transmission to a route which the accepted Full decision signal is for. Also, when accepting a Full decision clear signal, the read controlling unit 132 clears the setting of stopping frame transmission to a route which the accepted Full decision clear signal is for. Furthermore, when accepting an Empty decision signal, the read controlling unit 132 makes a setting of prioritizing frame transmission to a route which the accepted Empty decision signal is for. Still further, when accepting an Empty decision clear signal, the read controlling unit 132 clears the setting of prioritizing frame transmission to a route which the accepted Empty decision clear signal is for.

Next, transmission to the per-output-route FIFO-capacity emulating unit 200 is explained. For every reading of a frame from the per-destination-route buffer 121, the read controlling unit 132 transmits a route to which the frame is to be transmitted, the route stored in the buffer from which the frame is read, and the capacity of the read frame to each per-output-route FIFO-capacity emulating unit 200.

For example, a specific example is explained where a frame of "100 bytes" is read from the buffer (transmitting side) "1". The read controlling unit 132 transmits the route "1" and the capacity "100 bytes" to each of the per-output-route FIFO-capacity emulating units 200 for the routes "1" to "n", respectively.

Although a scheme is explained in the first embodiment where the read controlling unit 132 transmits the route and the capacity to all of the per-output-route FIFO-capacity emulating units 200, the present invention is not meant to be restricted to this. Alternatively, for example, the read controlling unit 132 may transmit the route and the capacity to only the per-output-route FIFO-capacity emulating unit 200 for the relevant route. Specifically, for example, when reading a frame from the buffer (transmitting side) "1", the read controlling unit 132 may transmit the route and the capacity only to the per-output-route FIFO-capacity emulating unit 200 for the route "1".

[Configuration of the Frame Receiving Apparatus]

Next, by using FIG. 2, the configuration of the frame receiving apparatus 300 is explained. The frame receiving apparatus 300 receives a frame transmitted from the frame transmitting apparatus 100. Also, the frame receiving apparatus 300 includes an output-route distributing unit 310. The output-route distributing unit 310 reads a frame stored in a burst-absorption FIFO unit 321. Here, the output-route distributing unit 310 particularly includes the burst-absorption FIFO unit 321 and the distributing unit 331.

The burst-absorption FIFO unit 321 is connected to the distributing unit 331. Also, the burst-absorption FIFO unit 321 has stored therein frames transmitted from the frame transmitting apparatus 100. Specifically, the burst-absorption FIFO unit 321 includes a plurality of buffers. Also, the burst-absorption FIFO unit 321 accumulates frames transmitted by the frame transmitting apparatus 100 to the routes in a different buffer (receiving side) for each route.

For example, a specific example is explained in which routes "1" to "n" are present. The burst-absorption FIFO unit 321 includes buffers (receiving side) "route 1" to "route n". The buffers (receiving side) "route 1" to "route n" have stored therein frames to be transmitted to the routes "1" to "n", respectively.

Also, the burst-absorption FIFO unit 321 receives inputs of frames from the distributing unit 331, and then accumulates these frames. Furthermore, any frame accumulated in the burst-absorption FIFO unit 321 is read by the frame receiving apparatus 300. Note that, when a frame accumulated in the burst-absorption FIFO unit 321 is read, the read frame is deleted from the burst-absorption FIFO unit 321 or is rewritten with another frame.

Note in the first embodiment that, for convenience of explanation, all frames to be transmitted from the frame transmitting apparatus 100 are transmitted to the frame receiving apparatus 300. Therefore, it is assumed that the burst-absorption FIFO unit 321 includes buffers (receiving side) as many as the number of routes to which a frame is transmitted by the frame transmitting apparatus 100.

The distributing unit 331 is connected to the burst-absorption FIFO unit 321, and is also connected to the frame transmitting apparatus 100 via an optical transmission line or the like. Also, the distributing unit 331 receives a frame from the frame transmitting apparatus 100. The distributing unit 331 stores a received frame in each buffer for each route to which the frame is transmitted.

Specifically, for example, when receiving a frame transmitted by the frame transmitting apparatus 100 to the route "1", the distributing unit 331 stores the frame in the buffer (receiving side) "1".

Although not depicted in FIG. 2, the frame receiving apparatus 300 includes components necessary for a frame transmitting process included in the frame transmitting apparatus 100. With this, for example, the frame receiving apparatus 300 transmits a frame received from the frame transmitting apparatus 100 to another apparatus.

[Configuration of the Per-Output-Route FIFO-Capacity Emulating Unit]

Figure 3:
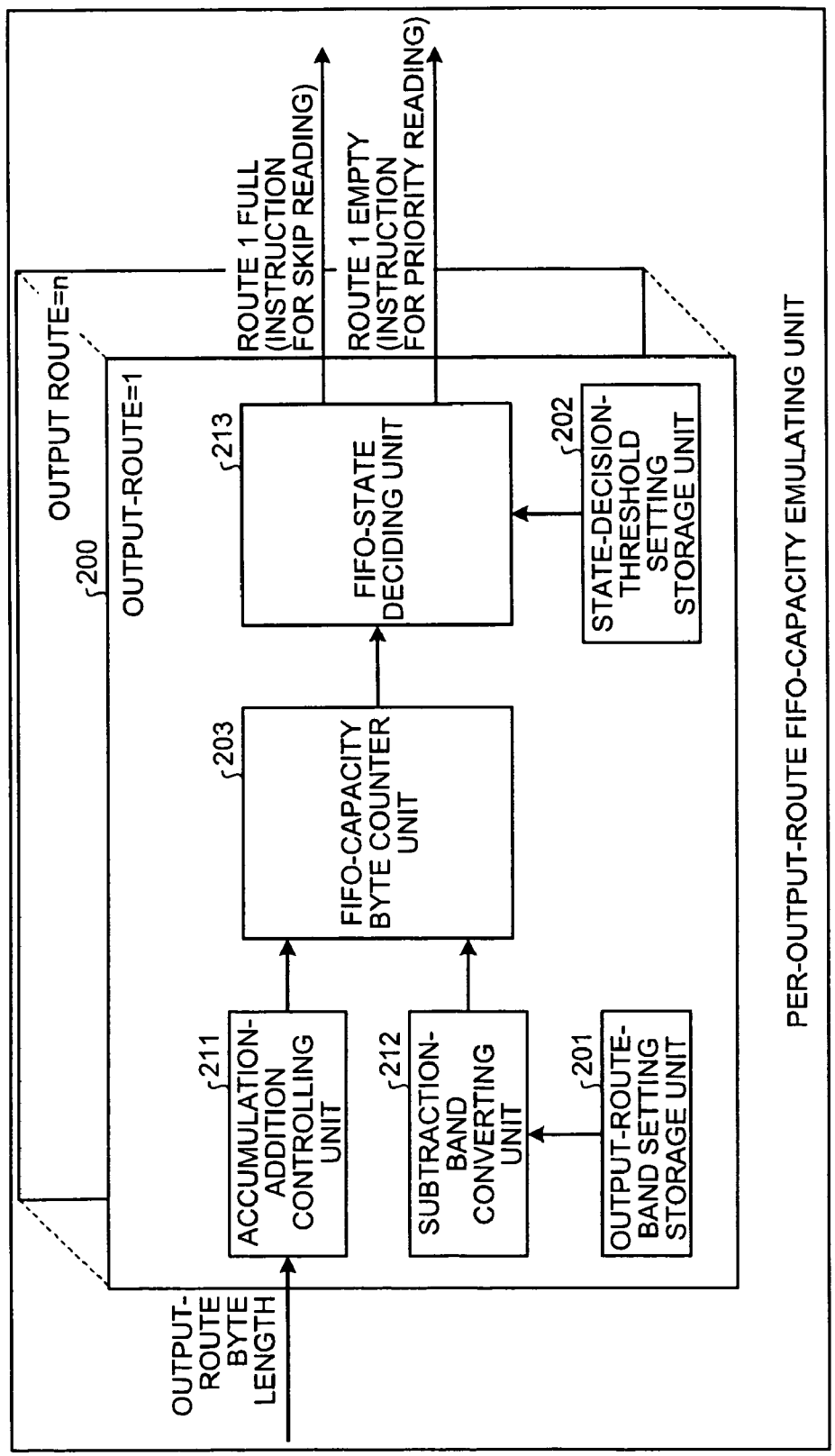
FIG. 3 is a block diagram for explaining the configuration of a per-output-route FIFO-capacity emulating unit in the first embodiment.

Next, by using FIGS. 3 to 6, the configuration of the per-output-route FIFO-capacity emulating unit 200 is explained. FIG. 3 is a block diagram for explaining the configuration of the per-output-route FIFO-capacity emulating unit 200 in the first embodiment.

In the first embodiment, a technique is explained in which the per-output-route FIFO-capacity emulating unit 200 is provided for each route. Each per-output-route FIFO-capacity emulating unit 200 performs a process only for a route assigned thereto. In the following, the per-output-route FIFO-capacity emulating unit 200 that performs a process for the route "1" is explained unless otherwise specified.

As depicted in FIG. 3, the per-output-route FIFO-capacity emulating unit 200 particularly includes, as storage units, an output-route-band setting storage unit 201, a state-decision-threshold setting storage unit 202, and a FIFO-capacity byte counter unit 203.

The output-route-band setting storage unit 201 is connected to a subtraction-band converting unit 212. The output-route-band setting storage unit 201 has an output band stored therein, as depicted in FIG. 4. Specifically, for example, the output-route-band setting storage unit 201 has an output band "1 gigabit per second" for the route "1".

In the first embodiment, it is assumed in explanation that the output-route-band setting storage unit 201 has stored therein only the output band for the route for process. However, the present invention is not meant to be restricted to this. Alternatively, the output-route-band setting storage unit 201 may have stored therein output bands for a plurality of routes. FIG. 4 is a drawing for explaining an example of route and output bands stored in the output-route-band setting storage unit in the first embodiment. In FIG. 4, not only the output band for the route "1" but also output bands for other routes are exemplarily depicted.

Also, an association between a route and an output band stored in the output-route-band setting storage unit 201 is input in advance by a user using the frame transmitting apparatus 100, for example. Furthermore, the output band stored in the output-route-band setting storage unit 201 in association with the route is used by the subtraction-band converting unit 212.

The state-decision-threshold setting storage unit 202 (hereinafter, also referred to as "threshold storage unit") is connected to the FIFO-state deciding unit 213. Also, the state-decision-threshold setting storage unit 202 has decision thresholds stored therein, as depicted in FIG. 5. These decision thresholds are thresholds of the accumulated capacity value (will be explained further below) stored in the FIFO-capacity byte counter unit 203. FIG. 5 is a drawing for explaining an example of decision thresholds stored in the state-decision-threshold setting storage unit 202 in the first embodiment.

Specifically, as decision thresholds, the state-decision-threshold setting storage unit 202 has thresholds for use in Full decision and Empty decision, as depicted in FIG. 5. In the example depicted in FIG. 5, as a threshold for use in Full decision (hereinafter, also referred to as a "first threshold"), "1800 bytes or greater" is stored. Also, the state-decision-threshold setting storage unit 202 has stored therein "64 bytes or smaller" as a threshold for use in Empty decision (hereinafter, also referred to as a "second threshold").

Furthermore, as depicted in FIG. 5, the state-decision-threshold setting storage unit 202 has stored therein a threshold for use in Full decision clearing (a threshold when Full decision is cleared) and a threshold for use in Empty decision clearing (a threshold when Empty decision is cleared). In the example depicted in FIG. 5, as a threshold for use in Full decision clearing, "1600 bytes or smaller" is stored in the state-decision-threshold setting storage unit 202. Also, the state-decision-threshold setting storage unit 202 has stored therein "128 bytes or greater" as a threshold for use in Empty decision clearing.

Here, a Full decision is a decision made by the FIFO-state deciding unit 213 such that a frame with a capacity equal to or greater than the capacity currently accumulated in the buffer (receiving side) cannot be accumulated. Thus, as a threshold for use in Full decision, an upper-limit capacity value of a frame that can be accumulated in the buffer (receiving side) is used, for example.

An Empty decision is a decision made by the FIFO-state deciding unit 213 indicative of a blank state where no frames are currently stored in the buffer (receiving side). Thus, as a threshold for use in Empty decision, a value close to "0 byte" in comparison with the capacity of a frame that can be accumulated in the buffer (receiving side) is used, for example.

A Full clear decision indicates that, after a Full decision is made by the FIFO-state deciding unit 213, it is decided again that the state is such that a frame can be accumulated in the buffer (receiving side). Thus, as a threshold for use in Full clear decision, a value obtained by subtracting a predetermined capacity from the upper-limit capacity of a frame that can be accumulated in the buffer (receiving side) is used, for example.

An Empty clear decision indicates that, after an Empty decision is made by the FIFO-state deciding unit 213, it is decided again that the state is such that frames are accumulated in the buffer (receiving side) and the buffer is not blank. Thus, as a threshold for use in Empty clear decision, a value obtained by adding a predetermined capacity to the value close to "0 byte" in comparison with the capacity of the frame that can be accumulated in the buffer (receiving side), for example.

For the thresholds stored in the state-decision-threshold setting storage unit 202, arbitrary values are input in advance by the user using the frame transmitting apparatus 100, for example. Also, the thresholds stored in the state-decision-threshold setting storage unit 202 are used by the FIFO-state deciding unit 213.

In the first embodiment, it is assumed in the explanation that the state-decision-threshold setting storage unit 202 has stored therein only the decision threshold for the route for process. However, the present invention is not meant to be restricted to this. Alternatively, the state-decision-threshold setting storage unit 202 may have stored therein decision thresholds for a plurality of routes. Although not particularly mentioned in the first embodiment, a different decision threshold may be used for each route, or the same threshold may be used for a plurality of routes.

The FIFO-capacity byte counter unit 203 (hereinafter, also referred to as an "accumulated-capacity-value storage unit") is connected to an accumulation-addition controlling unit 211, the subtraction-band converting unit 212, and the FIFO-state deciding unit 213. Also, the FIFO-capacity byte counter unit 203 has an accumulated capacity value stored therein. The accumulated capacity value is a value calculated in the frame transmitting apparatus 100 as a value indicative of the capacity of frames accumulated in the burst-absorption FIFO unit 321 of the frame receiving apparatus 300.

For example, as depicted in FIG. 6, the FIFO-capacity byte counter unit 203 has stored therein an accumulated capacity value "1500 bytes" for the route "1". FIG. 6 is a drawing for explaining an example of accumulated capacity values stored in the FIFO-capacity byte counter unit 203 in the first embodiment.

In the first embodiment, it is assumed in the explanation that the FIFO-capacity byte counter unit 203 has stored therein only the accumulated capacity value for the route for process. However, the present invention is not meant to be restricted to this. Alternatively, the FIFO-capacity byte counter unit 203 may have stored therein accumulated capacity values for a plurality of routes. For example, FIG. 6 exemplarily depicts not only the accumulated capacity value for the route "1" but also accumulated capacity values for other routes.

Also, the accumulated capacity values stored in the FIFO-capacity byte counter unit 203 are subjected to addition and subtraction by the accumulation-addition controlling unit 211 and the subtraction-band converting unit 212. Furthermore, the accumulated capacity values stored in the FIFO-capacity byte counter unit 203 are used by the FIFO-state deciding unit 213.

Still further, as depicted in FIG. 3, the per-output-route FIFO-capacity emulating unit 200 particularly includes the accumulation-addition controlling unit 211, the subtraction-band converting unit 212, and the FIFO-state deciding unit 213, as controlling units.

The accumulation-addition controlling unit 211 (hereinafter, also referred to as an "adding unit") is connected to the FIFO-state deciding unit 213, and is also connected to the read controlling unit 132. The accumulation-addition controlling unit 211 adds a value to the accumulated capacity value. Specifically, every time the frame transmitting apparatus 100 transmits a frame, the accumulation-addition controlling unit 211 adds a value indicative of the capacity of the transmitted frame to the accumulated capacity value stored in the FIFO-capacity byte counter unit 203.

For example, the accumulation-addition controlling unit 211 accepts from the read controlling unit 132 the "route" to which the frame is transmitted and the "capacity" of the transmitted frame. Here, the accumulation-addition controlling unit 211 decides whether the route to be processed by the accumulation-addition controlling unit 211 matches the accepted route. If the routes match, the accumulation-addition controlling unit 211 adds the "capacity" accepted from the read controlling unit 132 to the accumulated capacity value.

For example, it is assumed in the explanation that the accumulated capacity value for the route "1" is "800 bytes". Here, when accepting from the read controlling unit 132 the route "1" and the capacity "100 bytes", the accumulation-addition controlling unit 211 decides whether the route "1" to be processed by the accumulation-addition controlling unit 211 matches the accepted route "1". Here, the accumulation-addition controlling unit 211 decides that these routes match. The accumulation-addition controlling unit 211 then adds the accepted "100 bytes" to the accumulated capacity value "800 bytes", resulting in "900 bytes".

The subtraction-band converting unit 212 is connected to the output-route-band setting storage unit 201 and the FIFO-capacity byte counter unit 203. The subtraction-band converting unit 212 subtracts a value from the accumulated capacity value. Specifically, at every cycle calculated from the output band stored in the output-route-band setting storage unit 201, the subtraction-band converting unit 212 subtracts from the accumulated capacity value stored in the FIFO-capacity byte counter unit 203 the read capacity calculated from the output band.

For example, a specific example is explained in which the cycle is "1 clock" and the read capacity is "1 byte" for a route "k". In this example, every time "1 clock" elapsed, the subtraction-band converting unit 212 subtracts "1 byte" from the accumulated capacity value for "k". Since the "cycle" and the "read capacity" are values calculated from the output band, these values are calculated for each route.

The cycle and the read capacity calculated from the output band are further explained. An example is explained in which the frame transmitting apparatus 100 and the frame receiving apparatus 300 operate at 125 megahertz. For example, the "cycle" and a "subtraction capacity" corresponding to an output band "1 gigabit per second" are a cycle "1 clock" and a read capacity "1 byte". That is, at every "1 clock" in the apparatuses operating at 125 megahertz, "1 byte" is subtracted. Similarly, for example, the "cycle" and a "subtraction capacity" corresponding to an output band "1 megabit per second" are a cycle "10 clocks" and a read capacity "1 byte". That is, at every "1 clocks" in the apparatuses operating at 125 megahertz, "1 byte" is subtracted.

Similarly, when the apparatuses operate at 150 megahertz, the "cycle" and a "subtraction capacity" corresponding to an output band "1 gigabit per second" are a cycle "6 clocks" and a read capacity "5 bytes". That is, at every "6 clocks" in the apparatuses operating at 150 megahertz, "5 bytes" are subtracted.

When using the cycle and the read capacity calculated from the output band to perform, subtracting process, the subtraction-band converting unit 212 stores the cycle and the read capacity in a storage unit (not shown, and hereinafter also referred to as a "cycle and capacity storage unit"), for example. Specifically, for example, the subtraction-band converting unit 212 has a storage area, such as a cache or memory, and stores the cycle and the read capacity in the storage area. Then, the subtraction-band converting unit 212 uses the cycle and the read capacity to perform a subtraction.

Although the technique of calculating the cycle and the read capacity from the output band is explained in the first embodiment, the present invention is not meant to be restricted to this. For example, the subtraction-band converting unit 212 may perform a subtraction with the cycle and the read capacity being input in advance from the user for storage.

The FIFO-state deciding unit 213 (hereinafter, also referred to as a "transmission controlling unit") is connected to the state-decision-threshold setting storage unit 202 and the FIFO-capacity byte counter unit 203. Also, the FIFO-state deciding unit 213 uses the accumulated capacity value stored in the state-decision-threshold setting storage unit 202 to perform a Full decision, an Empty decision, a Full clear decision, and an Empty clear decision. Furthermore, the FIFO-state deciding unit 213 notifies the read controlling unit 132 of the decision result.

Specifically, the FIFO-state deciding unit 213 reads the accumulated capacity value stored in the FIFO-capacity byte counter unit 203. The FIFO-state deciding unit 213 then decides whether the accumulated capacity value satisfies the threshold stored in the state-decision-threshold setting storage unit 202. When deciding that the accumulated capacity value satisfies the threshold stored in the state-decision-threshold setting storage unit 202, the FIFO-state deciding unit 213 reads the decision result, and transmits the decision result to the read controlling unit 132.

Specifically, for example, when the accumulated capacity value is "1800", the FIFO-state deciding unit 213 decides that the accumulated capacity value satisfies the threshold "1800 bytes or greater" for "Full decision". The FIFO-state deciding unit 213 then transmits to the read controlling unit 132 a Full decision signal representing information indicating that it is decided as a Full decision.

Here, the FIFO-state deciding unit 213 performs a deciding process at predetermined cycles, for example. However, the present invention is not meant to be restricted to the case where the FIFO-state deciding unit 213 performs a deciding process at predetermined cycles. Alternatively, for example, a deciding process may be performed every time a value is added to the accumulated capacity value stored in the FIFO-capacity byte counter unit 203. Still alternatively, for example, a deciding process may be performed every time a value is subtracted from the accumulated capacity value stored in the FIFO-capacity byte counter unit 203.

The disclosed frame transmitting apparatus 100 is used in a case where a frame transmitting apparatus and a frame receiving apparatus are physically separated. An exemplary configuration is such that the frame transmitting apparatus and the frame receiving apparatus are disposed in a distributed manner between apparatuses, packages, or devices, which are connected via a transmission path in which all output routes are multiplexed. Thus, the disclosed frame transmitting apparatus 100 can also be applied to a case where an apparatus that receives a frame transmitted from the disclosed frame transmitting apparatus 100 is present within the same apparatus as that of the disclosed frame transmitting apparatus 100.

[Process by the Frame Transmitting Apparatus]

Next, by using FIGS. 7 to 10, a process by the frame transmitting apparatus is explained. In the following, an example of a flow of an accumulated-capacity-value adding process is first explained, and then an example of a flow of an accumulated-capacity-value subtracting process is explained. Then, an example of a flow of a deciding process is explained, and then an example of a flow of frame transmission control is explained.

[Accumulated-Capacity-Value Adding Process]

Figure 7:
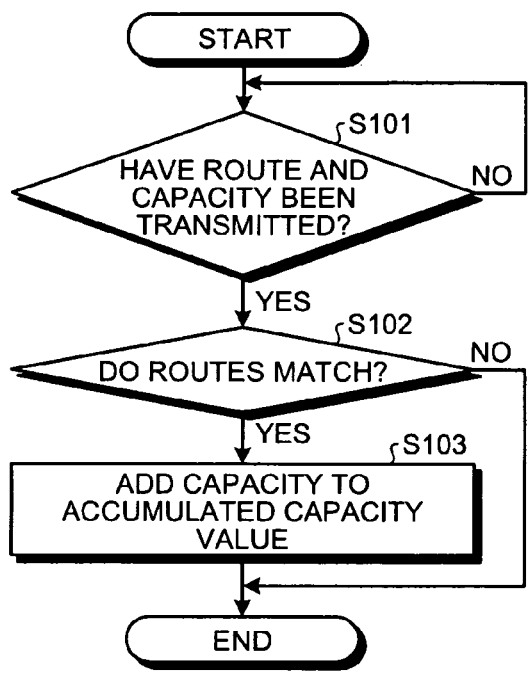
FIG. 7 is a flowchart depicting an example of a flow of an accumulated-capacity-value adding process by the frame transmitting apparatus according to the first embodiment.

By using FIG. 7, an example of a flow of an accumulated-capacity-value adding process by the frame transmitting apparatus 100 according to the first embodiment is explained. FIG. 7 is a flowchart depicting an example of a flow of an accumulated-capacity-value adding process by the frame transmitting apparatus 100 according to the first embodiment.

As depicted in FIG. 7, when accepting the "route" to which a frame is transmitted and the "capacity" of the transmitted frame from the read controlling unit 132 (step "Yes" at S101), the accumulation-addition controlling unit 211 decides whether the routes match (step S102). That is, the accumulation-addition controlling unit 211 decides whether the route to be processed by the accumulation-addition controlling unit 211 matches the accepted route.

When the routes match ("Yes" at step S102), the accumulation-addition controlling unit 211 adds the "capacity" accepted from the read controlling unit 132 to the accumulated capacity value (step S103). For example, it is assumed that the route to be processed by the accumulation-addition controlling unit 211 is the route "1" and the accumulated capacity value for the route "1" is "800 bytes". In this case, when accepting the route "1" and the capacity "100 bytes" from the read controlling unit 132, the accumulation-addition controlling unit 211 adds "100 bytes" to the accumulated capacity value "800 bytes", resulting in "900 bytes".

On the other hand, when the routes do not match ("No" at step S102), the accumulation-addition controlling unit 211 ends the procedure.

[Accumulated-Capacity-Value Subtracting Process]

Figure 8:
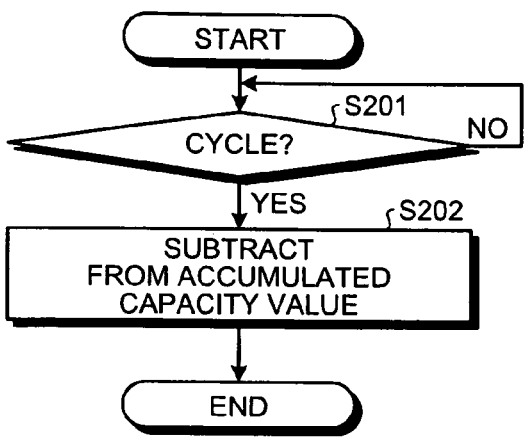
FIG. 8 is a flowchart depicting an example of a flow of an accumulated-capacity-value subtracting process by the frame transmitting apparatus according to the first embodiment.

By using FIG. 8, an example of a flow of an accumulated-capacity-value subtracting process by the frame transmitting apparatus 100 according to the first embodiment is explained. FIG. 8 is a flowchart depicting an example of a flow of an accumulated-capacity-value subtracting process by the frame transmitting apparatus 100 according to the first embodiment.

As depicted in FIG. 8, when the cycle comes ("Yes" at step S201), the subtraction-band converting unit 212 subtracts from the accumulated capacity value (step S202). That is, at every cycle, the subtraction-band converting unit 212 subtracts the read capacity calculated from the output band from the accumulated capacity value stored in the FIFO-capacity byte counter unit 203. A specific example is explained in which the cycle is "1 clock" and the read capacity is "1 byte" for the route "k". In this example, every time "1 clock" elapsed, the subtraction-band converting unit 212 subtracts "1 byte" from the accumulated capacity value for "k".

Also, at every cycle, the subtraction-band converting unit 212 repeats a process of subtracting the read capacity from the accumulated capacity value.

[Deciding Process]

Figure 9:
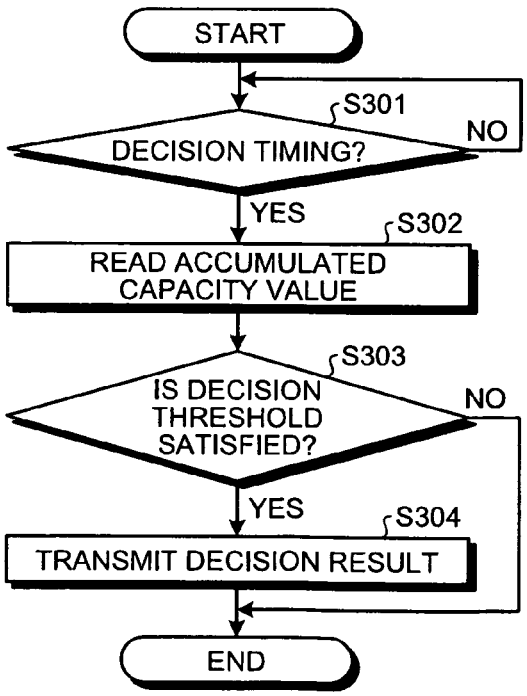
FIG. 9 is a flowchart depicting an example of a flow of a deciding process by the frame transmitting apparatus according to the first embodiment.

By using FIG. 9, an example of a flow of a deciding process by the frame transmitting apparatus 100 according to the first embodiment is explained. FIG. 9 is a flowchart depicting an example of a flow of a deciding process by the frame transmitting apparatus 100 to the first embodiment.

As depicted in FIG. 9, when a decision timing comes ("Yes" at step S301), the FIFO-state deciding unit 213 reads the accumulated capacity value stored in the FIFO-capacity byte counter unit 203 (step S302). For example, the FIFO-state deciding unit 213 reads an accumulated capacity value "1800".

The FIFO-state deciding unit 213 then decides whether the accumulated capacity value satisfies the threshold stored in the state-decision-threshold setting storage unit 202 (step S303). When deciding that the accumulated capacity value satisfies decision threshold stored in the state-decision-threshold setting storage unit 202 ("Yes" at step S303), the FIFO-state deciding unit 213 transmits the decision result to the read controlling unit 132 (step S304). For example, the FIFO-state deciding unit 213 decides that the accumulated capacity value satisfies the threshold "1800 bytes or greater" for "Full decision". The FIFO-state deciding unit 213 then transmits to the read controlling unit 132 a Full decision signal representing information indicating that it is decided as a Full decision.

On the other hand, when the FIFO-state deciding unit 213 decides that the accumulated capacity value does not satisfy any decision threshold stored in the state-decision-threshold setting storage unit 202 ("No" at step S303), the procedure ends.

[Frame Transmission Control]

Figure 10:
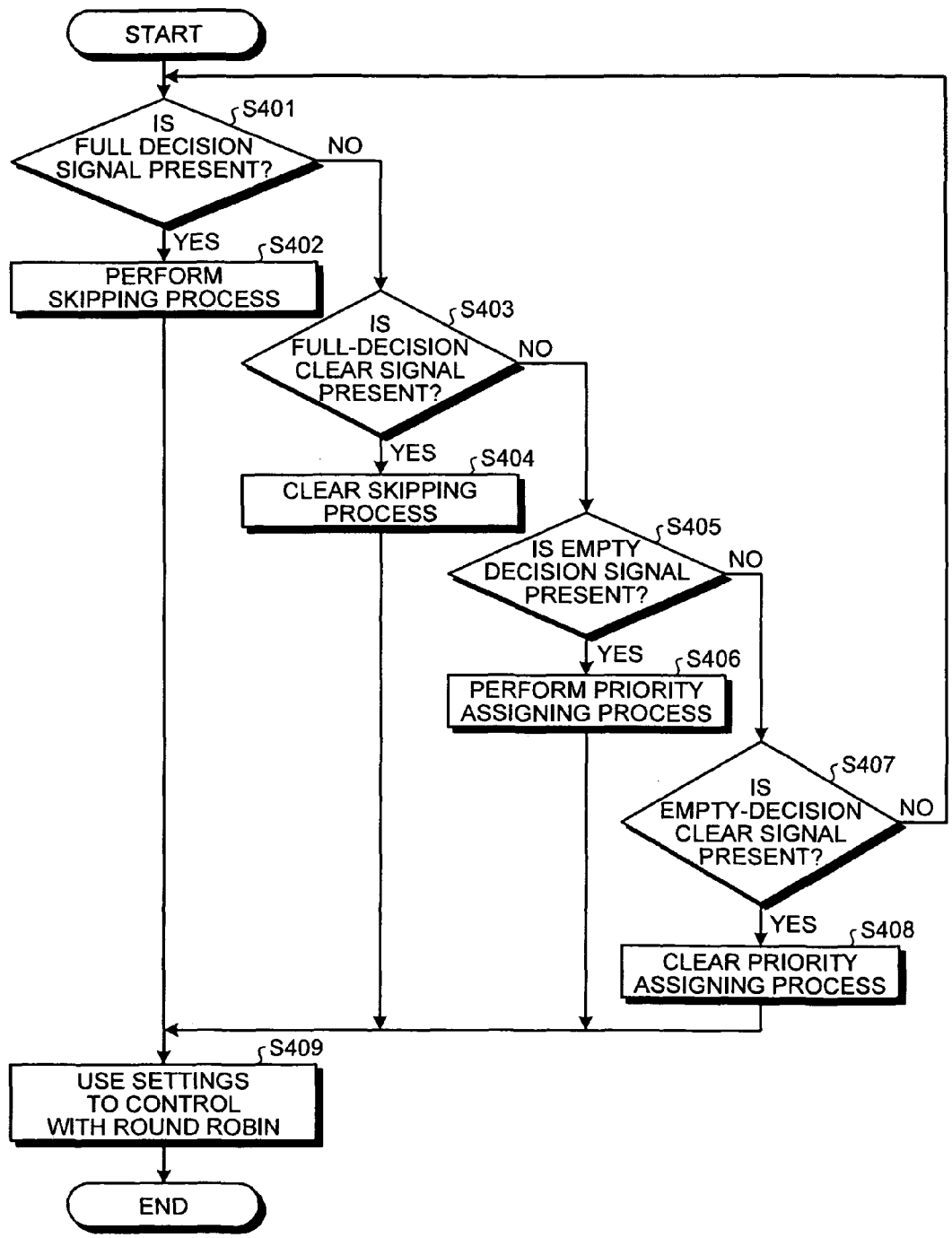
FIG. 10 is a flowchart depicting an example of a flow of a frame-transmission control by the frame transmitting apparatus according to the first embodiment.

By using FIG. 10, an example of a flow of a frame-transmission control by the frame transmitting apparatus 100 according to the first embodiment is explained. FIG. 10 is a flowchart depicting an example of a flow of a frame-transmission control by the frame transmitting apparatus 100 according to the first embodiment.

As depicted in FIG. 10, when accepting a Full decision signal ("Yes" at step S401), the read controlling unit 132 performs a skipping process (step S402). That is, the read controlling unit 132 makes a setting of stopping frame transmission to a route which the accepted Full decision signal is for.

When accepting a Full decision clear signal ("No" at step S401 and "Yes" at step S403), the read controlling unit 132 clears the skipping process (step S404). That is, the read controlling unit 132 clears the setting of stopping frame transmission to a route to which the accepted Full decision signal is for.

When accepting an Empty decision signal ("No" at step S401, "No" at step S403, and "Yes" at step S405), the read controlling unit 132 performs a priority assigning process (step S406). That is, the read controlling unit 132 makes a setting of prioritizing frame transmission to a route which the accepted Empty decision signal is for.

When accepting an Empty decision clear signal ("No" at step S401, "No" at step S403, "No" at step S405, and "Yes" at step S407), the read controlling unit 132 clears the priority assigning process (step S408). That is, the read controlling unit 132 clears the setting of prioritizing frame transmission to a route which the accepted Empty decision clear signal is for.

The read controlling unit 132 then uses the settings in read control for each route to control a reading process (step S409).

When not accepting any signal ("No" at step S401, "No" at step S403, "No" at step S405, and "No" at step S407), the read controlling unit 132 does not change the settings in read control for each route until receiving any signal.

[Effects of the First Embodiment]

As explained above, according to the first embodiment, the disclosed frame transmitting apparatus 100 has an accumulated capacity value stored therein. For every frame transmission, the disclosed frame transmitting apparatus 100 adds a value indicative of the capacity of the frame to the accumulated capacity value and, at every cycle, subtracts a value indicative of a read capacity from the accumulated capacity value. The disclosed frame transmitting apparatus 100 then uses the accumulated capacity value to control frame transmission. With this, the disclosed frame transmitting apparatus 100 can reduce traffic from the frame receiving apparatus 300 to the frame transmitting apparatus 100.

Figure 11:
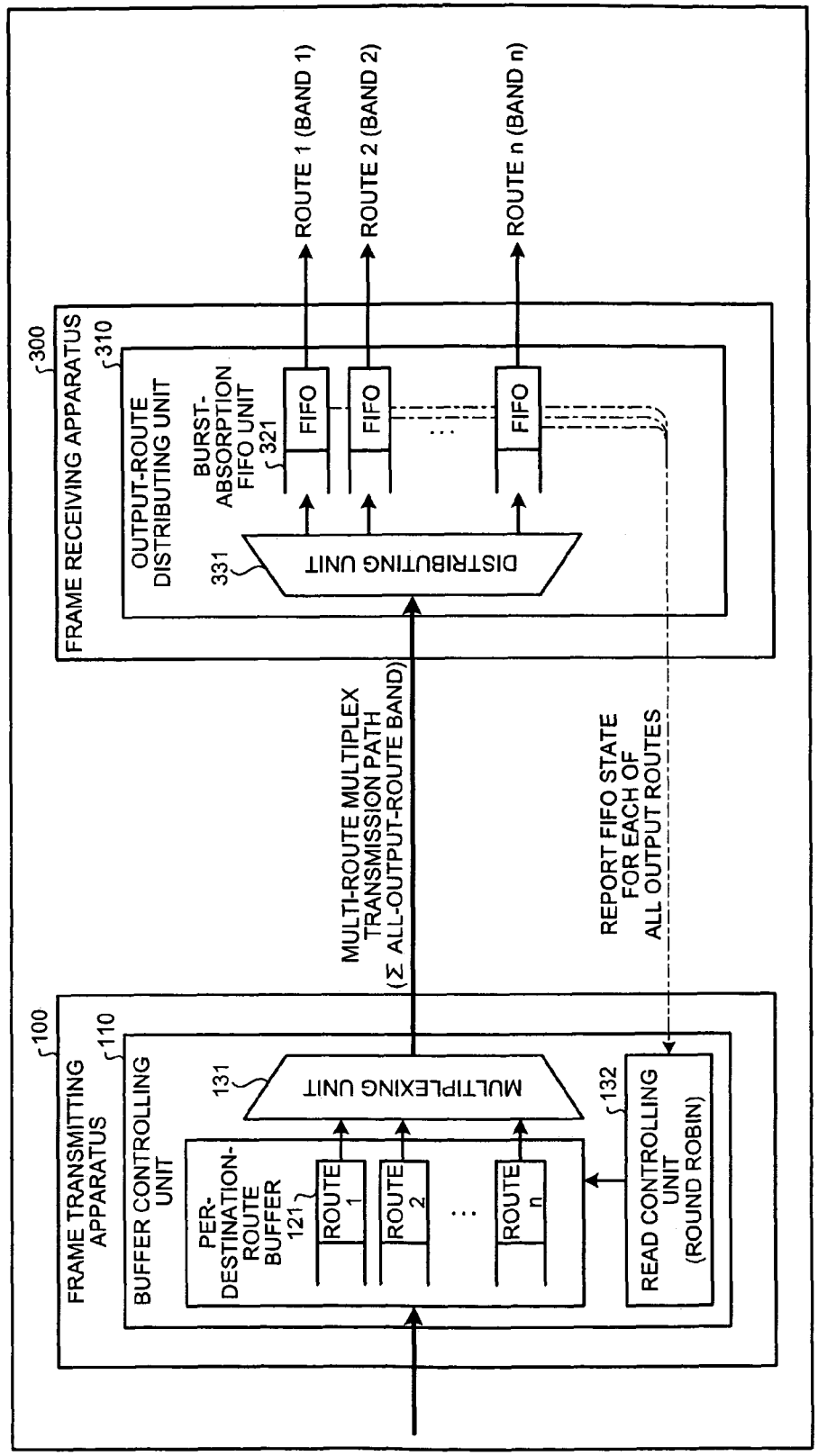
FIG. 11 is a drawing for explaining an effect of the frame transmitting apparatus according to the first embodiment.

Specifically, in the conventional technique, as depicted in FIG. 11, a frame transmitting apparatus receives, from a frame receiving apparatus, frame accumulation information of a buffer included in the frame receiving apparatus, and uses the received frame accumulation information to control frame transmission. FIG. 11 is a drawing for explaining an effect of the frame transmitting apparatus 100 according to the first embodiment.

Figure 12:
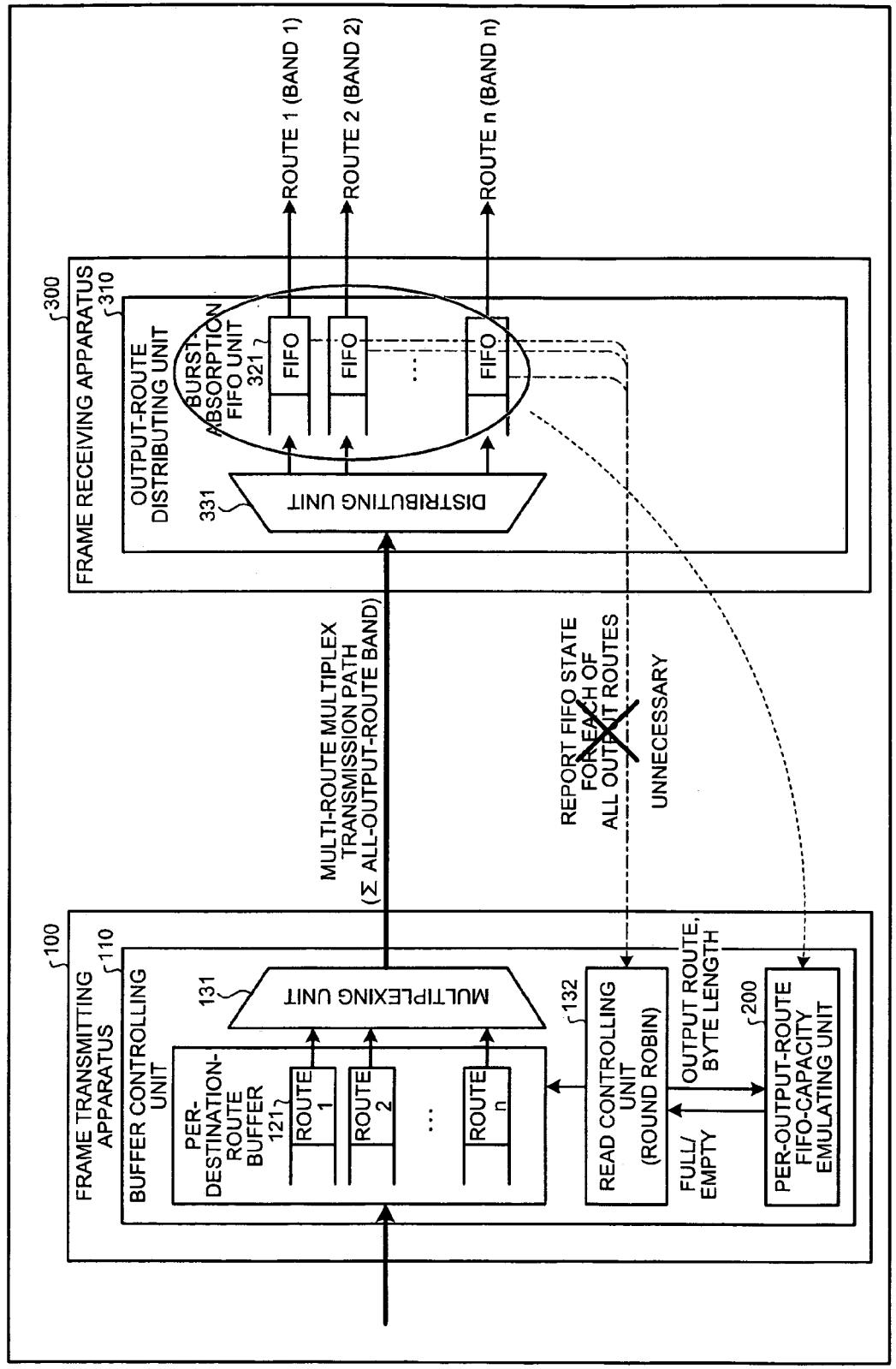
FIG. 12 is a drawing for explaining an effect of the frame transmitting apparatus according to the first embodiment.

In comparison with such a conventional technique, in the disclosed frame transmitting apparatus 100, the frame transmitting apparatus itself emulates the frame accumulation state of the frame receiving apparatus 300. Also, instead of the frame accumulation information received from the frame receiving apparatus 300, the emulation result is used to control frame transmission. Therefore, as depicted in FIG. 12, traffic from the frame receiving apparatus 300 to the frame transmitting apparatus 100 can be reduced (or eliminated).

Also, according to the disclosed frame transmitting apparatus 100, in comparison with the conventional technique, frame transmitting process according to the frame accumulation information of the frame transmitting apparatus 100 can be performed even without transmitting the frame accumulation information from the frame transmitting apparatus 100 to the frame receiving apparatus 300. Therefore, for example, circuitry and connection wirings for communication from the frame receiving apparatus 300 to the frame transmitting apparatus 100 can be eliminated or simplified. Also, according to the disclosed frame transmitting apparatus 100, burst occurring in the frame receiving apparatus 300 can be minimized.

Furthermore, in the conventional technique, to prevent an underflow, a transmission path band is set as "actual transmission path band+α". In comparison with such a conventional technique, according to the disclosed frame transmitting apparatus 100, when it is decided that there is a high possibility that an underflow may occur in a route (port) (for example, when an Empty decision is made), transmission to that route can be prioritized. As a result, according to the disclosed frame transmitting apparatus 100, the transmission path band of a multi-route multiplex transmission path can be achieved in a Σ all-output-route band. Therefore, there is no need to increase the transmission path band more than +α, thereby suppressing an operation frequency. Here, the Σ output-route band is a band representing a total of output bands for the respective routes.

Still further, in comparison with the conventional technique, no burst-absorption FIFO unit 321 having an enormous amount of capacity is not required to be implemented on a frame receiving apparatus 300 side. Thus, the capacity of the burst-absorption FIFO unit 321 can be suppressed to a maximum transmission byte length.

Second Embodiment

In the foregoing, in the first embodiment, a technique of resolving a deviation of a clock signal (clock deviation) in the frame transmitting apparatus 100 is not particularly mentioned. However, the present invention is not meant to be restricted to this. In a second embodiment, a technique of resolving a clock deviation of the frame transmitting apparatus 100 is explained.

The clock deviation is a shift of a clock signal of the frame transmitting apparatus 100 in comparison with a clock signal of the frame receiving apparatus 300. For example, a clock deviation occurs when the clock signals used by the frame transmitting apparatus 100 and the frame receiving apparatus 300 are those of different systems.

Figure 13:
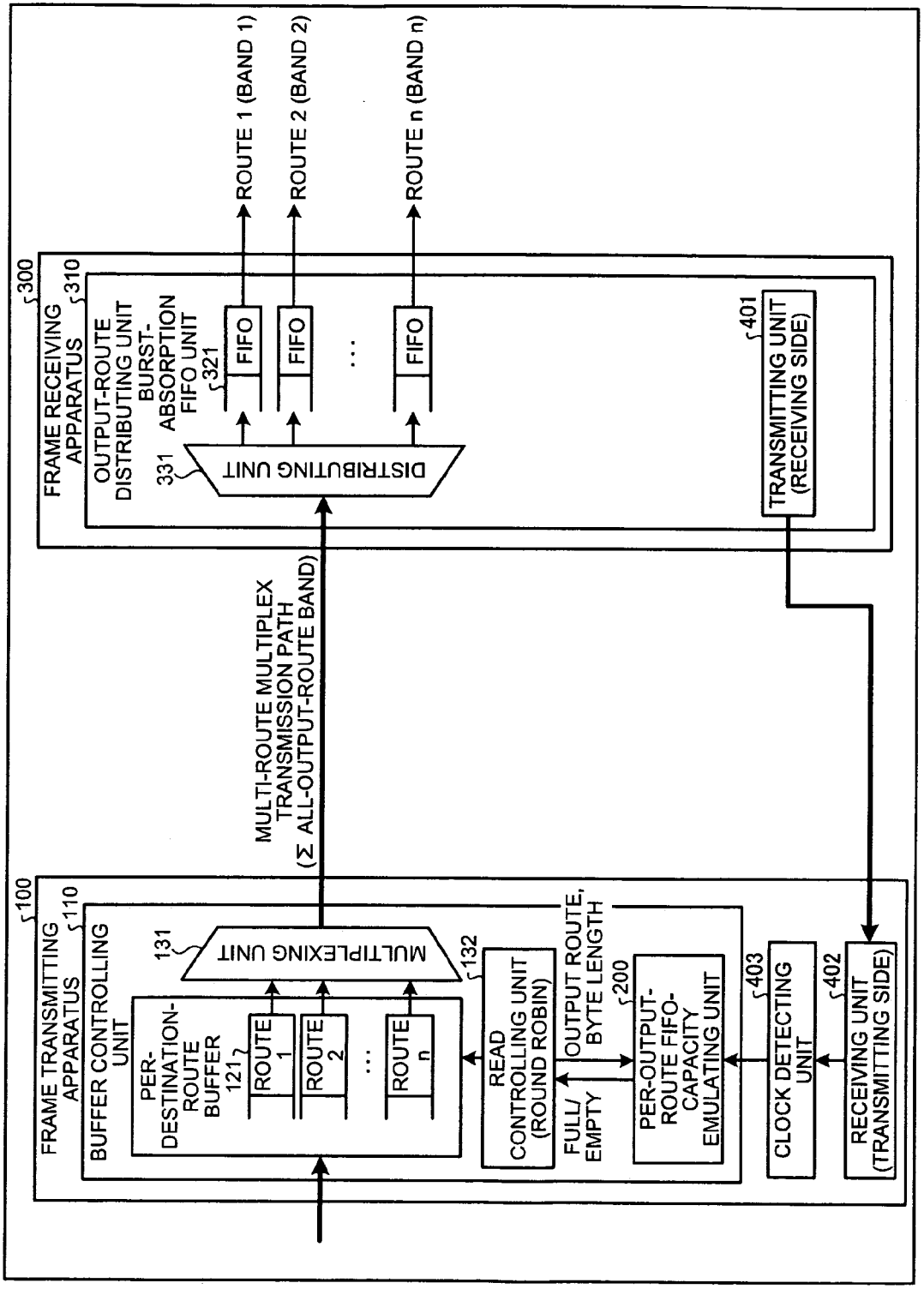
FIG. 13 is a drawing for explaining a frame transmitting apparatus according to a second embodiment.
Figure 14:
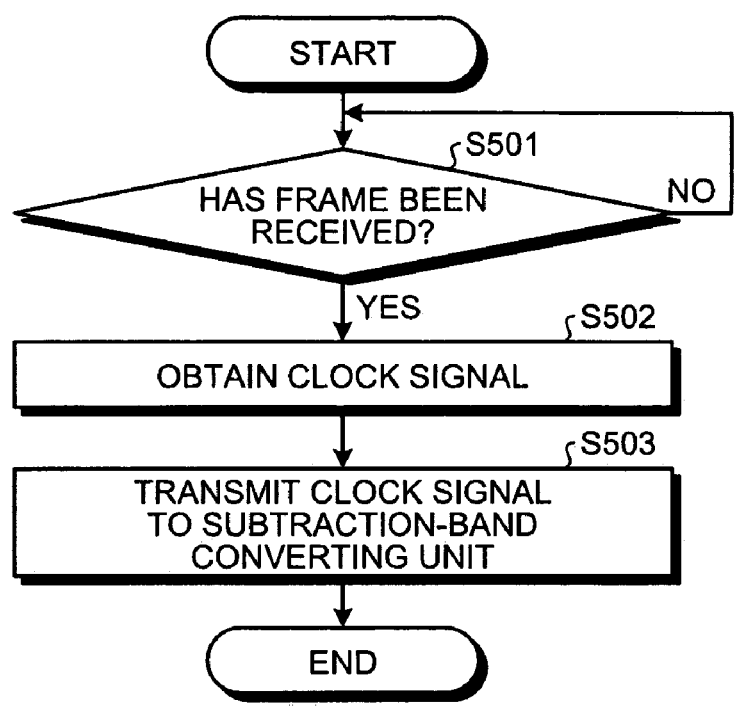
FIG. 14 is a flowchart depicting an example of a flow of a process by the frame transmitting apparatus according to the second embodiment.

In the second embodiment, by using FIGS. 13 and 14, a technique of resolving a deviation in clock signal is explained. In the following, for explaining the frame transmitting apparatus 100 according to the second embodiment, portions similar to those of the frame transmitting apparatus 100 according to the first embodiment are explained in a simplified manner or are not explained herein.

As depicted in FIG. 13, the frame receiving apparatus 300 according to the second embodiment further includes a transmitting unit (receiving apparatus) 401 in addition to the components of the frame receiving apparatus 300 depicted in FIG. 2. FIG. 13 is a drawing for explaining a frame transmitting apparatus according to the second embodiment.

The transmitting unit (receiving apparatus) 401 is connected via an optical communication line or the like to the frame transmitting apparatus 100 (a receiving unit (transmitting apparatus) 402). The transmitting unit (receiving apparatus) 401 transmits a frame to the frame transmitting apparatus 100. Here, the transmitting unit (receiving apparatus) 401 has a configuration similar to that of the frame transmitting apparatus 100 according to the first embodiment.

Also, as depicted in FIG. 13, the frame transmitting apparatus 100 according to the second embodiment further includes the receiving unit (transmitting apparatus) 402 and a clock detecting unit 403 in addition to the components of the frame transmitting apparatus 100 according to the first embodiment depicted in FIG. 2.

The receiving unit (transmitting apparatus) 402 is connected to the clock detecting unit 403. Also, the receiving unit (transmitting apparatus) 402 is connected to the frame receiving apparatus 300 (the transmitting unit (receiving apparatus) 401) via an optical communication line or the like. Furthermore, the receiving unit (transmitting apparatus) 402 receives a frame transmitted from the frame receiving apparatus 300 to the frame transmitting apparatus 100. For example, the receiving unit (transmitting apparatus) 402 has a configuration similar to that of the frame receiving apparatus 300 according to the first embodiment.

The clock detecting unit 403 is connected to the receiving unit (transmitting apparatus) 402 and each per-output-route FIFO-capacity emulating unit 200. Also, the clock detecting unit 403 receives a clock concurrently running and sent by the receiving unit (transmitting apparatus) 402 to obtain a clock signal. In another method of obtaining a clock signal, when a clock does not concurrently run with a frame, a clock-data-recovery (CDR) function is provided to the receiving unit (transmitting apparatus) 402 for reproducing a clock. Specifically, with this CDR function, an edge timing of frame data is detected with a phase-locked loop (PLL), and a clock is reproduced by using an oscillation frequency and a phase-adjusting function of a voltage-controlled oscillator (VCO), thereby obtaining a clock signal. The clock detecting unit 403 then transmits the obtained clock signal to each per-output-route FIFO-capacity emulating unit 200 (each subtraction-band converting unit 212).

The subtraction-band converting unit 212 receives the clock signal from the clock detecting unit 403. The subtraction-band converting unit 212 then uses the clock signal detected by the clock detecting unit 403 to perform a subtracting process.

The significance of the second embodiment is now noted. The frame transmitting apparatus 100 and the frame receiving apparatus 300 performs processes based on each unique clock signal. In the clock signal for use by the frame transmitting apparatus 100, a clock deviation may occur, in comparison with the clock signal for use by the frame receiving apparatus 300. If such a clock deviation occurs, a shift occurs between the accumulated capacity value of the FIFO-capacity byte counter unit 203 and the capacity of the frames actually accumulated in the burst-absorption FIFO unit 321.

For example, when the clock signal for use by the frame receiving apparatus 300 is slower than the clock signal for use by the frame transmitting apparatus 100, the subtraction-band converting unit 212 performs a subtracting process at faster cycles than the actual cycles. Moreover, when the clock signal for use by the frame receiving apparatus 300 is faster than the clock signal for use by the frame transmitting apparatus 100, the subtraction-band converting unit 212 performs a subtracting process at slower cycles than the actual cycles. As a result, a shift occurs between the accumulated capacity value of the FIFO-capacity byte counter unit 203 and the capacity of the frames actually accumulated in the burst-absorption FIFO unit 321. The frame transmitting apparatus 100 according to the third embodiment can prevent such a shift due to a clock deviation.

[Process of the Frame Transmitting Apparatus According to the Second Embodiment]

Next, by using FIG. 14, a flow of a process by the frame transmitting apparatus 100 according to the second embodiment is explained. FIG. 14 is a flowchart for explaining an example of a flow of a process by the frame transmitting apparatus 100 according to the second embodiment.

As depicted in FIG. 14, in the frame transmitting apparatus 100 according to the second embodiment, when a frame is received ("Yes" at step S501), the clock detecting unit 403 obtains a clock signal (step S502). The clock detecting unit 403 then transmits the obtained clock signal to each subtraction-band converting unit 212 (step S503). When the clock signal is transmitted from the clock detecting unit 403, the subtraction-band converting unit 212 uses the transmitted clock signal to perform a subtracting process.

[Effects of the Second Embodiment]

As explained above, according to the second embodiment, the disclosed frame transmitting apparatus 100 receives a frame transmitted from the frame receiving apparatus 300 to the frame transmitting apparatus 100, and then obtains a clock signal from the received frame. The disclosed frame transmitting apparatus 100 then uses the obtained clock signal to perform a subtracting process. With this, when a deviation in clock signal is present between the frame transmitting apparatus 100 and the frame receiving apparatus 300, the disclosed frame transmitting apparatus 100 can resolve the deviation, thereby increasing accuracy of emulation in the frame transmitting apparatus 100.

Third Embodiment

In the foregoing, in the first and second embodiment, the technique of the frame transmitting apparatus 100 receiving frame accumulation information from the frame receiving apparatus 300 is not particularly mentioned. However, the present invention is not meant to be restricted to this. Specifically, when the frame capacity accumulated in the buffer (receiving side) exceeds a predetermined upper-limit value, the frame receiving apparatus 300 may transmits to the frame transmitting apparatus 100 information indicating that the frame capacity exceeds the upper-limit value.

In the following, by using FIGS. 15 and 16, as a third embodiment, a technique is explained in which the frame transmitting apparatus 100 is notified, by the frame receiving apparatus 300 through hardware or firmware, of information that the frame capacity exceeds the upper-limit value. In the following, for explaining the frame transmitting apparatus 100 according to the third embodiment, portions similar to those of the frame transmitting apparatus 100 according to the first or second embodiment are explained in a simplified manner or are not explained herein.

Figure 15:
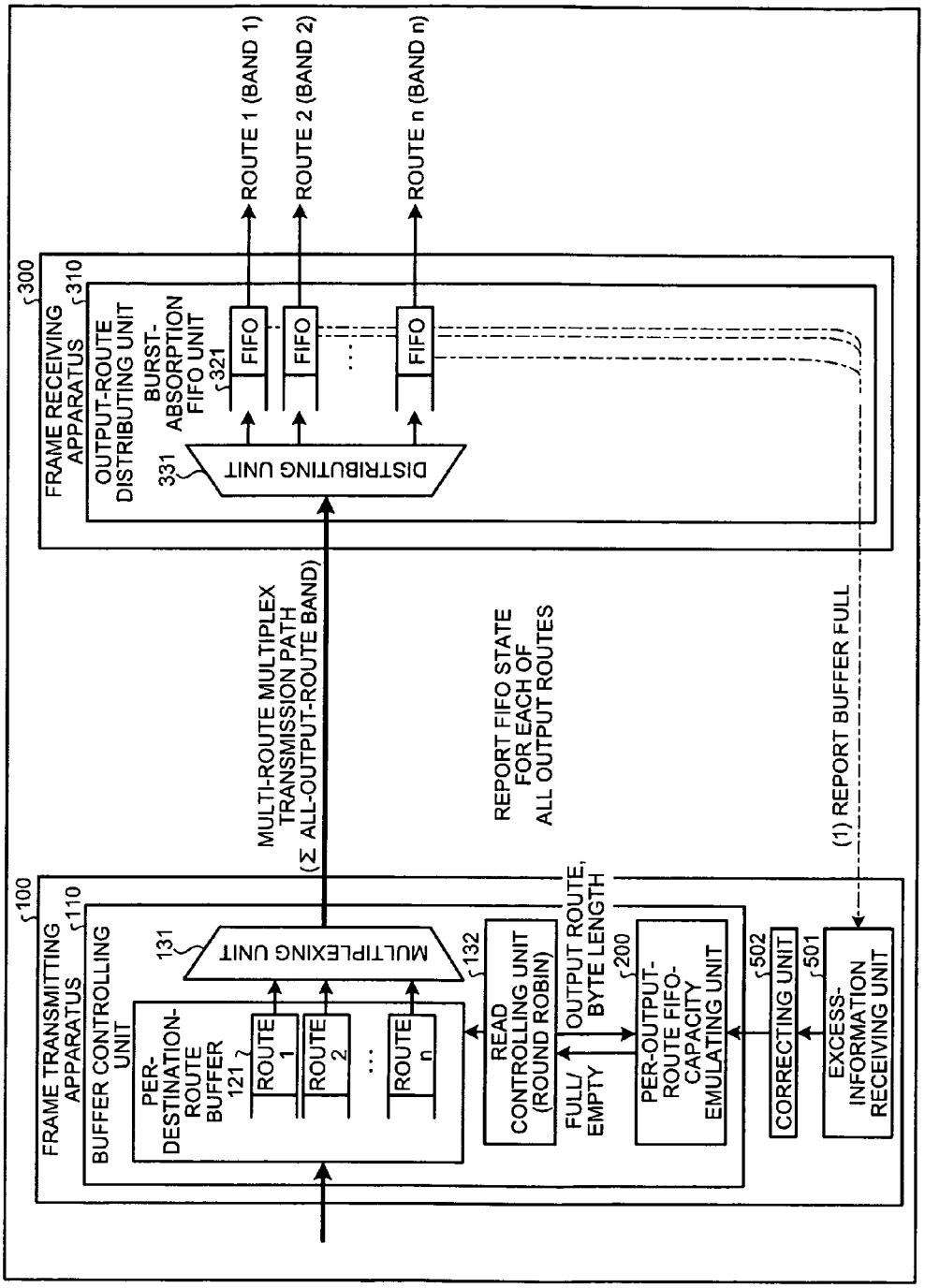
FIG. 15 is a drawing for explaining a frame transmitting apparatus according to a third embodiment.

In FIG. 15, as indicated by (1), when the frame capacity accumulated in the buffer (receiving side) exceeds a predetermined upper-limit value, the frame receiving apparatus 300 according to the third embodiment transmits to the frame receiving apparatus 300 excess information indicating that the frame capacity exceeds the predetermined upper-limit value. FIG. 15 is a drawing for explaining the frame transmitting apparatus according to the third embodiment.

For example, an example is explained in which the predetermined upper-limit value of the buffer (receiving side) "1" in which the frame transmitted from the route "1" is accumulated is "1800 bytes". When 1800 bytes or greater of frames are accumulated in the buffer (receiving side) "1", the frame receiving apparatus 300 transmits excess information for the route "1" (for example, "buffer Full") to the frame transmitting apparatus 100.

The frame transmitting apparatus 100 according to the third embodiment further includes an excess-information receiving unit 501 and a correcting unit 502.

The excess-information receiving unit 501 is connected to the correcting unit 502. Also, the excess-information receiving unit 501 is connected to the frame receiving apparatus 300 via an optical communication line or the like. Furthermore, the excess-information receiving unit 501 receives excess information from the frame receiving apparatus 300. The excess-information receiving unit 501 then transmits the received excess information to the correcting unit 502.

For example, the excess-information receiving unit 501 receives from the frame receiving apparatus 300 excess information for the route "1" (for example, "buffer Full"). The excess-information receiving unit 501 then transmits the excess information for the route "1" to the correcting unit 502.

The correcting unit 502 is connected to the excess-information receiving unit 501 and the FIFO-capacity byte counter unit 203. Also, when excess information is received by the excess-information receiving unit 501, the correcting unit 502 corrects the accumulated capacity value stored in the FIFO-capacity byte counter unit 203 to a predetermined upper-limit value.

For example, to the correcting unit 502, excess information for the route "1" is transmitted from the excess-information receiving unit 501. The correcting unit 502 then corrects the accumulated capacity value for the route "1" to a predetermined upper-limit value (for example, "1800 bytes").

[Process of the Frame Transmitting Apparatus According to the Third Embodiment]

Figure 16:
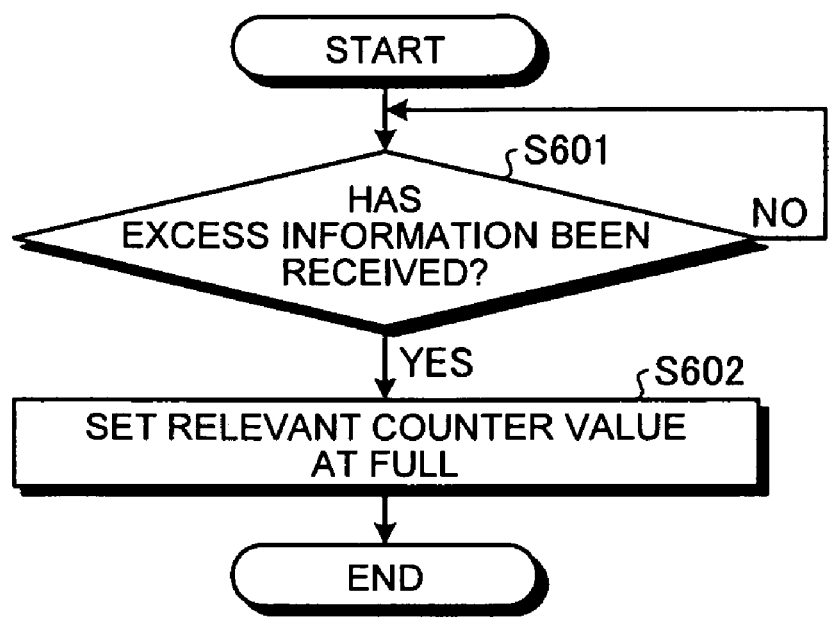
FIG. 16 is a flowchart depicting an example of a flow of a process by the frame transmitting apparatus according to the third embodiment.

Next, by using FIG. 16, an example of a flow of a process by the frame transmitting apparatus 100 according to the third embodiment is explained. FIG. 16 is a flowchart for explaining an example of a flow of a process by the frame transmitting apparatus 100 according to the third embodiment.

As depicted in FIG. 16, in the frame transmitting apparatus 100 according to the third embodiment, when excess information is received from the frame receiving apparatus 300 ("Yes" at step S601), the correcting unit 502 corrects the accumulated capacity value to a predetermined upper-limit value (step S602). For example, when the excess information for the route "1" is transmitted from the excess-information receiving unit 501, the accumulated capacity value for the route "1" is corrected to the predetermined upper-limit value.

[Effects of the Third Embodiment]

As explained above, according to the third embodiment, the disclosed frame transmitting apparatus 100 receives excess information from the frame receiving apparatus 300. When receiving the excess information, the disclosed frame transmitting apparatus 100 corrects the accumulated capacity value to the predetermined upper-limit value. With this, according to the disclosed frame transmitting apparatus 100, when the buffer is full in the frame receiving apparatus 300, the accumulated capacity value can be corrected. That is, according to the disclosed frame transmitting apparatus 100, while suppressing traffic from the frame receiving apparatus 300 to the frame transmitting apparatus 100 more than the conventional technique, the accuracy of emulation in the frame transmitting apparatus 100 can be increased.

Fourth Embodiment

While the embodiments of the present invention have been explained, the present invention can be implemented with those other than the embodiments explained above. In the following, such other embodiments are explained.

[Per-Output-Route FIFO-Capacity Emulating Unit]

For example, in the first to third embodiments, the buffer controlling unit 110 includes the per-output-route FIFO-capacity emulating unit 200 for each route. However, the present invention is not meant to be restricted to this. Alternatively, for example, if one per-output-route FIFO-capacity emulating unit 200 performs processes for a plurality of routes, the buffer controlling unit 110 may include only a smaller number of (for example, one) per-output-route FIFO-capacity emulating unit(s) 200 than the number of routes.

[Combinations of the Embodiments]

For example, in the first to third embodiments, (1) the technique of using the accumulated capacity value obtained through emulation in the frame transmitting apparatus to perform a frame transmitting process, (2) the technique of resolving a clock deviation, and (3) the technique of receiving excess information from the frame receiving apparatus 300 are explained, respectively. Here, although not particularly mentioned in the first to third embodiments, in the disclosed frame transmitting apparatus 100, in addition to (1), either one or both of (2) and (3) may be performed.

[System Configuration]

Also, the process procedure, the control procedure, specific names, and information including various data and parameters in the specification and the drawings (for example, FIGS. 1 to 16) can be arbitrarily changed unless otherwise specified.

Furthermore, each component of the apparatus depicted in the drawings is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various loads and the state of use. For example, with FIG. 3 being taken as an example, the accumulation-addition controlling unit 211 and the subtraction-band converting unit 212 may be unified.

[Program]

Figure 17:
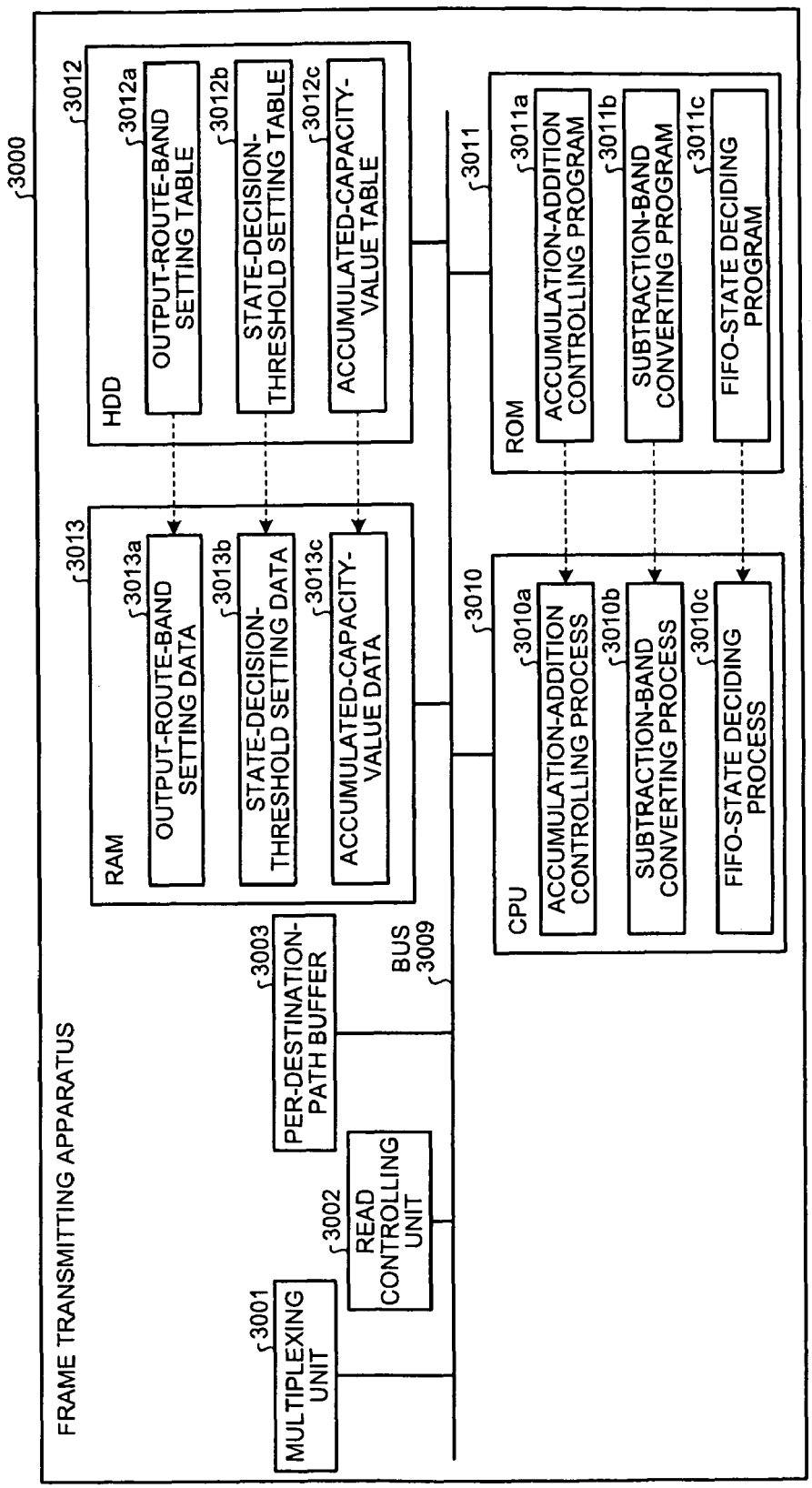
FIG. 17 is a drawing for explaining a program of the frame transmitting apparatus according to the first embodiment.

Various processes explained in the embodiments can be achieved by a computer, such as a personal computer or a work station, executing a previously-provided program. In the following, by using FIG. 17, an example of a computer executing a frame transmitting program having similar functions as those in the embodiments is explained. FIG. 17 is a drawing for explaining a program of the frame transmitting apparatus according to the first embodiment.

As depicted in the drawing, a frame transmitting apparatus 3000 in the first embodiment is configured of a multiplexing unit 3001, a read controlling unit 3002, a per-destination-path buffer 3003, a Central Processing Unit (CPU) 3010, a Read Only Memory (ROM) 3011, an Hard Disk Drive (HDD) 3012, and a Random Access Memory (RAM) 3013 being connected via a bus 3009.

The ROM 3011 has previously stored therein control programs achieving functions similar to those of the accumulation-addition controlling unit 211, the subtraction-band converting unit 212, and the FIFO-state deciding unit 213 explained in the first embodiment, that is, as depicted in FIG. 17, an accumulation-addition controlling program 3011a, a subtraction-band converting program 3011b, and a FIFO-state deciding program 3011c. Note that these programs 3011a to 3011c may be unified or separated as appropriate, as with each component of the frame transmitting apparatus depicted in FIGS. 2 and 3.

By the CPU 3010 reading these programs 3011a to 3011c from the ROM 3011 for execution, as depicted in FIG. 17, the programs 3011a to 3011c function as an accumulation-addition controlling process 3010a, a subtraction-band converting process 3010b, and a FIFO-state deciding process 3010c. Here, the processes 3010a to 3010c correspond to the accumulation-addition controlling unit 211, the subtraction-band converting unit 212, and the FIFO-state deciding unit 213 depicted in FIGS. 2 and 3, respectively.

The HDD 3012 is provided with an output-route-band setting table 3012a, a state-decision-threshold setting table 3012b, and an accumulated-capacity-value table 3012c. Note that the tables 3012a to 3012c correspond to the output-route-band setting storage unit 201, the state-decision-threshold setting storage unit 202, and the FIFO-capacity byte counter unit 203 depicted in FIG. 3, respectively.

The CPU 3010 reads the output-route-band setting table 3012a, the state-decision-threshold setting table 3012b, and the accumulated-capacity-value table 3012c for storage in the RAM 3013, and uses output-route-band setting data 3013a, state-decision-threshold setting data 3013b, and the accumulated-capacity-value data 3013c stored in the PAN 3013 to execute a frame transmitting program.

[Others]

Note that the frame transmitting apparatus explained in the embodiments can be achieved by a computer, such as a personal computer or a work station, executing a program previously proved. This program can be distributed over a network, such as the Internet. Also, this program can be recorded on a computer-readable recording medium, such as a hard disk, a flexible disk (FD), a Compact-Disk Read Only Memory (CD-ROM), a Magneto-optical (MO) disk, or a Digital Versatile Disk (DVD), and can be executed by being read from the recording medium by the computer.

According to the embodiments, traffic from the frame receiving apparatus to the frame transmitting apparatus can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A frame transmitting apparatus that transmits a frame to a frame receiving apparatus, wherein the frame transmitting apparatus transmits a frame to a plurality of routes, and the frame receiving apparatus accumulates frames transmitted to the routes in buffers for the respective routes, the frame transmitting apparatus comprising:

an accumulated-capacity-value storage unit that has stored therein an accumulated capacity value calculated by the frame transmitting apparatus as a value indicative of a capacity of the frame accumulated in a buffer of the frame receiving apparatus in association with the respective routes;

a cycle and capacity storage unit that has stored therein a cycle at which the frame accumulated in the buffer is read by the frame receiving apparatus and a frame read capacity read by the frame receiving apparatus at every cycle in association with the respective routes;

a threshold storage unit that has stored therein a first threshold and a second threshold in association with the routes as thresholds for accumulated capacity value of the accumulated capacity value stored in the accumulated-capacity-value storage unit;

an adding unit that adds, for every transmission of the frame, the value indicative of the capacity of the frame to the accumulated capacity value stored in association with a route to which the frame is transmitted by the accumulated-capacity-value storage unit;

a subtracting unit that subtracts, for each of the routes, at every cycle stored in the cycle and capacity storage unit in association with the route, the value indicative of the frame read capacity stored in the cycle and capacity storage unit in association with the route from the accumulated capacity value stored in the accumulated-capacity-value storage unit in association with the route; and a transmission controlling unit that controls frame transmission by using the accumulated capacity value stored in the accumulated-capacity-value storage unit;

wherein the transmission controlling unit, when controlling frame transmission with a round-robin technique by using each accumulated capacity values stored in the accumulated-capacity-value storage unit for each of the routes, decides whether each accumulated capacity value stored in the accumulated-capacity-value storage unit in association with each of the routes is greater than the first threshold stored in the threshold storage unit in association with each of the route, and stops a transmission to a route associated with the accumulated capacity value determined as being greater than the first threshold, and the transmission controlling unit decides whether each accumulated capacity values is smaller than the second threshold stored in the threshold storage unit in association with each of the routes, and prioritizes a transmission to a route associated with the accumulated capacity value determined as being smaller than the second threshold over a transmission to a route associated with the accumulated capacity value not determined as being smaller than the second threshold.

2. The frame transmitting apparatus according to claim 1, wherein
the frame transmitting apparatus and the frame receiving apparatus each perform a process based on each unique clock signal,
the frame transmitting apparatus further comprising:
a receiving unit that receives a frame transmitted from a frame receiving apparatus that receives a frame transmitted from the frame transmitting apparatus to the frame transmitting apparatus; and
a clock obtaining unit that obtains a clock signal form the frame received by the receiving unit, and
the subtracting unit performs a subtracting process by using the clock signal obtained by the clock obtaining unit.

3. The frame transmitting apparatus according to claim 1, further comprising:
an excess-information receiving unit that receives from the frame receiving apparatus excess information indicating that the buffer of the frame receiving apparatus exceeds a predetermined upper-limit value; and
a correcting unit that corrects the accumulated capacity value stored in the accumulated-capacity-value storage unit to the predetermined upper-limit value when the excess information is received by the excess-information receiving unit.

4. A method of transmitting a frame to a frame receiving apparatus, wherein the method of transmitting a frame to a plurality of routes, and the frame receiving apparatus accumulates frames transmitted to the routes in buffers for the respective routes, comprising:
adding, for every transmission of the frame, a value indicative of a capacity of the frame to an accumulated capacity value calculated by a frame transmitting apparatus and stored in an accumulated-capacity-value storage unit in association with the respective routes, the accumulated capacity value being indicative of a capacity of frames accumulated in a buffer of the frame receiving apparatus;
subtracting, at every cycle in which the frame receiving apparatus reads the frame accumulated in the buffer, a value indicative of a read capacity of the frame the frame receiving apparatus reads at every cycle from the accumulated capacity value stored in the accumulated-capacity-value storage unit in association with the respective routes;
deciding whether each accumulated capacity value stored in the accumulated-capacity-value storage unit in association with each of the routes is greater than a first threshold stored in a threshold storage unit in association with each of the route when controlling frame transmission with a round-robin technique by using each accumulated capacity values stored in the accumulated-capacity-value storage unit for each of the routes;

stopping a transmission to a route associated with the accumulated capacity value determined as being greater than the first threshold, the first threshold being a threshold for accumulated capacity value of the accumulated capacity value;
deciding whether each accumulated capacity values is smaller than a second threshold stored in the threshold storage unit in association with each of the routes; and
prioritizing a transmission to a route associated with the accumulated capacity value determined as being smaller than the second threshold over a transmission to a route associated with the accumulated capacity value not determined as being smaller than the second threshold;
wherein the first threshold and second threshold are thresholds for accumulated capacity value of the accumulated capacity value.

5. A non-transitory computer readable storage medium containing instructions concerning controlling a frame transmitting apparatus transmitting a frame to a plurality of routes to a frame receiving apparatus which accumulates frames transmitted to the routes in buffers for the respective routes, wherein the instructions that, when executed by a computer, cause the computer to perform:
adding, for every transmission of the frame, a value indicative of a capacity of the frame to an accumulated capacity value calculated by a frame transmitting apparatus and stored in an accumulated-capacity-value storage unit in association with the respective routes, the accumulated capacity value being indicative of a capacity of frames accumulated in a buffer of the frame receiving apparatus;
subtracting, at every cycle in which the frame receiving apparatus reads the frame accumulated in the buffer, a value indicative of a read capacity of the frame the frame receiving apparatus reads at every cycle from the accumulated capacity value stored in the accumulated-capacity-value storage unit in association with the respective routes;
deciding whether each accumulated capacity value stored in the accumulated-capacity-value storage unit in association with each of the routes is greater than a first threshold stored in a threshold storage unit in association with each of the route when controlling frame transmission with a round-robin technique by using each accumulated capacity values stored in the accumulated-capacity-value storage unit for each of the routes;
stopping a transmission to a route associated with the accumulated capacity value determined as being greater than the first threshold, the first threshold being a threshold for accumulated capacity value of the accumulated capacity value;
deciding whether each accumulated capacity values is smaller than a second threshold stored in the threshold storage unit in association with each of the routes; and
prioritizing a transmission to a route associated with the accumulated capacity value determined as being smaller than the second threshold over a transmission to a route associated with the accumulated capacity value not determined as being smaller than the second threshold;
wherein the first threshold and second threshold are thresholds for accumulated capacity value of the accumulated capacity value.

* * * * *